(12) United States Patent
Yamada et al.

(10) Patent No.: US 9,912,845 B2
(45) Date of Patent: Mar. 6, 2018

(54) VIDEO INFORMATION REPRODUCTION SYSTEM AND VIDEO INFORMATION REPRODUCTION DEVICE

(71) Applicant: Mitsubishi Electric Corporation, Tokyo (JP)

(72) Inventors: Kazuhiko Yamada, Tokyo (JP); Kiyoyasu Maruyama, Tokyo (JP); Keiji Uemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/550,685

(22) PCT Filed: Nov. 16, 2015

(86) PCT No.: PCT/JP2015/082082
§ 371 (c)(1),
(2) Date: Aug. 11, 2017

(87) PCT Pub. No.: WO2016/151936
PCT Pub. Date: Sep. 29, 2016

(65) Prior Publication Data
US 2018/0035018 A1    Feb. 1, 2018

(30) Foreign Application Priority Data
Mar. 26, 2015    (JP) ................. 2015-064333

(51) Int. Cl.
*H04N 5/06*    (2006.01)
*G06F 3/14*    (2006.01)
*H04N 5/917*    (2006.01)

(52) U.S. Cl.
CPC ............. *H04N 5/06* (2013.01); *G06F 3/1446* (2013.01); *H04N 5/917* (2013.01)

(58) Field of Classification Search
CPC ...... H04N 5/06; H04N 5/917; H04N 21/4305; H04N 5/04; H04N 5/08; H04N 5/10;
(Continued)

(56) References Cited

U.S. PATENT DOCUMENTS 6,477,204 B1 *  11/2002  Fukushima ........ H04N 21/4305
                                                    375/240.28
2014/0029910 A1    1/2014  Maruyama et al.

FOREIGN PATENT DOCUMENTS

JP    2001-268517 A    9/2001
JP    2003/153128 A    5/2003
(Continued)

*Primary Examiner* — Sherrie Hsia
(74) *Attorney, Agent, or Firm* — Birch, Stewart, Kolasch & Birch, LLP

(57) ABSTRACT

A video information reproduction system includes first and second video information reproduction devices. A first synchronization signal processor of the video information reproduction device as a master device generates a phase synchronization signal including a first vertical synchronization signal and a first counter value and sends it to the second video information reproduction device. A second synchronization signal processor of the second video information reproduction device as a slave device compares the phase synchronization signal with a second vertical synchronization signal on the basis of a second video clock signal, and a second clock generator changes the frequency of a second decode reference clock signal on the basis of a result of the comparison.

12 Claims, 18 Drawing Sheets

(58) Field of Classification Search
CPC ... H04N 9/12; H04N 5/66; H04N 5/44; G06F 3/1446
USPC ....... 348/383, 500, 521, 525, 529, 531, 537, 348/540, 547, 725, 726; 709/203; 386/220, 201
See application file for complete search history.

(56) References Cited

FOREIGN PATENT DOCUMENTS

| | | |
|---|---|---|
| JP | 2008-301146 A | 12/2008 |
| JP | 2009-122412 A | 6/2009 |
| JP | 2013-5029 A | 1/2013 |
| JP | 2014-127762 A | 7/2014 |
| WO | WO 2012/153434 A1 | 11/2012 |

* cited by examiner

| No. | PREPARATION TIME | REPRODUCTION TIME | REPRODUCTION PERIOD [s] | CONTENT NAME |
|---|---|---|---|---|
| 1 | 14:59:55 | 15:00:00 | 30 | CM_001 |
| 2 | 15:00:25 | 15:00:30 | 60 | CM_002 |
| 3 | 15:01:25 | 15:01:30 | 30 | CM_003 |
| 4 | 15:01:55 | 15:02:00 | 30 | CM_004 |
| ⋮ | ⋮ | ⋮ | ⋮ | ⋮ |

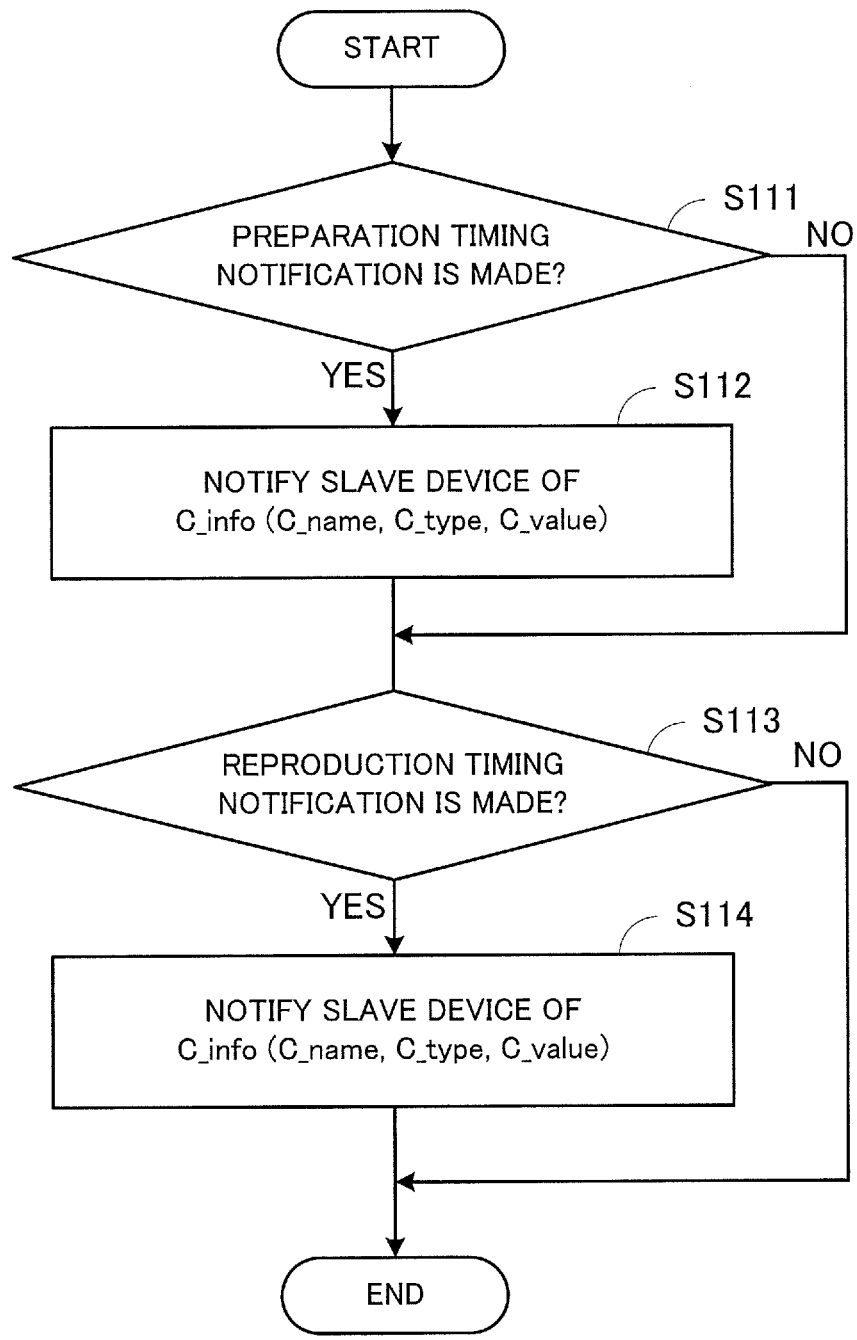

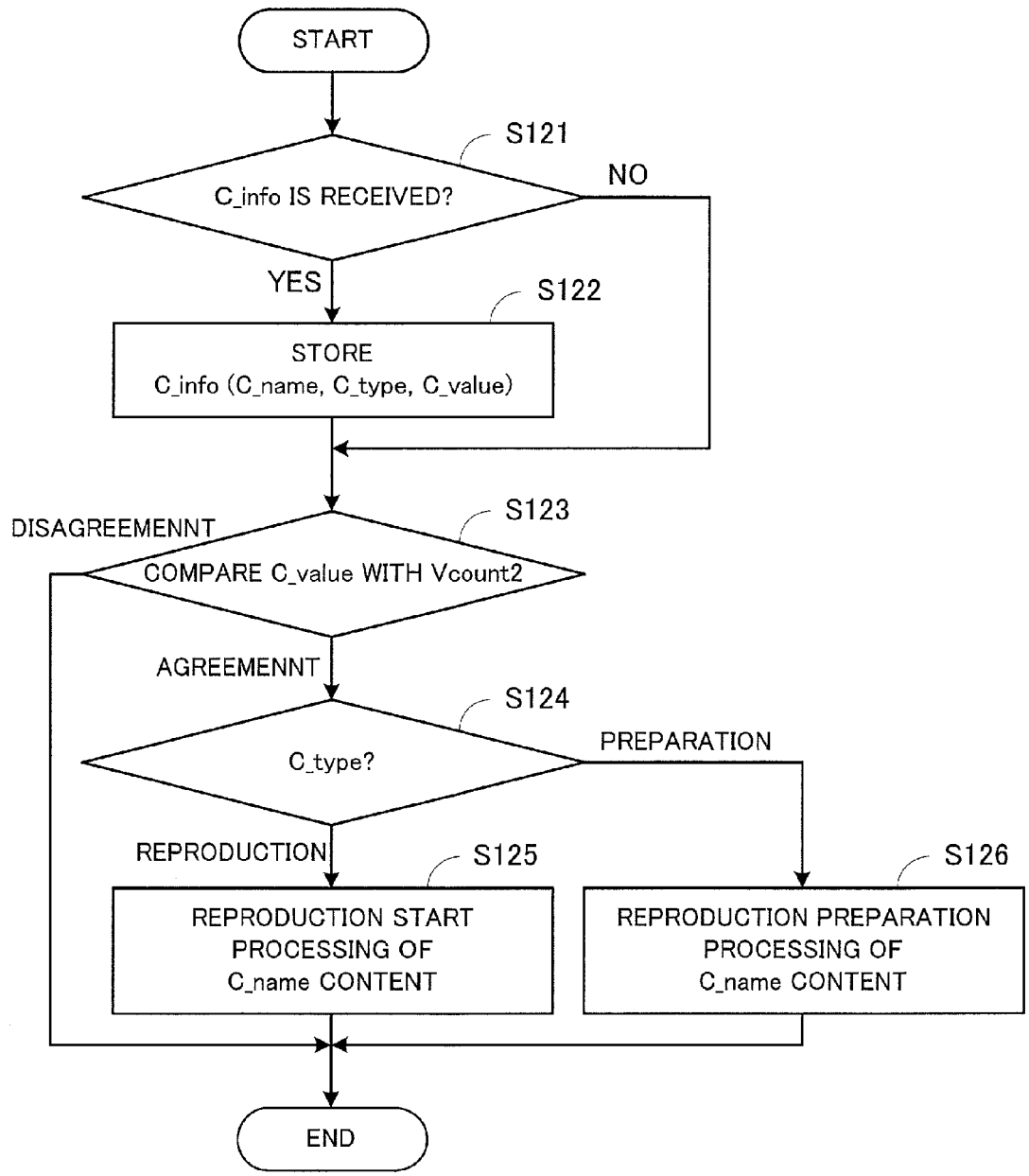

VIDEO INFORMATION REPRODUCTION SYSTEM AND VIDEO INFORMATION REPRODUCTION DEVICE

TECHNICAL FIELD

The present invention relates to a video information reproduction device and a video information reproduction system including a plurality of video information reproduction devices. In particular, the present invention relates to a technology by which a plurality of video information reproduction devices output a plurality of video signals in synchronization with one another.

BACKGROUND ART

A digital signage system is an advertising medium which displays pictures and information on a display unit such as a flat display or a projector, utilizing digital technologies for display and communications. Digital signage systems are placed, for example, on walls in commercial facilities such as department stores and supermarkets or on sign boards or the like in public facilities such as railroads and roads. Generally, video content reproduction methods include a method of reproducing video data that has been compressed by an encoding technology conforming to a standard such as MPEG2 (Moving Picture Experts Group phase 2) or H.264, distributed via a network or the like, and saved temporarily, and another method of reproducing video data that is distributed in real time. Further, the digital signage system can adopt display methods such as a display method of arranging a plurality of display units to form a single large screen and another display method of arranging a plurality of display units vertically and horizontally and making the display units work together to display individual images.

For example, Patent Reference 1 proposes a method of synchronizing videos displayed by a plurality of display units. In this method, video is stored in a memory as video data, and image processors one-to-one corresponding to the plurality of display units read the video data from the memory while adjusting timing.

Patent Reference 2 proposes a method of synchronizing digital video signals individually produced by decoding in a plurality of reproduction units when displaying is performed on a screen by one-to-one connecting the plurality of reproduction units to display units. In this method, displaying is performed on the screen by using one of the plurality of reproduction units as a master reproduction unit and the other ones as slave reproduction units, sending a reference clock from the master reproduction unit to the slave reproduction units, and decoding data in the slave reproduction units in synchronization with the clock sent from the master reproduction unit.

PRIOR ART REFERENCE

Patent Reference

Patent reference 1: Japanese patent application publication No. 2003-153128
Patent reference 2: Japanese patent application publication No. 2001-268517

SUMMARY OF THE INVENTION

Problem to be Solved by the Invention

The method of Patent Reference 1, however, has a problem that extremely large capacity is required for a memory for storing the video data to be displayed by the display units. For example, if a display system forms a large screen of 3840 pixels×2160 pixels by arranging 4 display units each having 1920 pixels×1080 pixels, a large capacity memory for storing a large amount of data is required.

In the method of Patent Reference 2, when a high-frequency clock is supplied from one reproduction unit to another reproduction unit, problems such as signal attenuation, blunted waveform, and the like are likely to occur. To avoid such problems, specially devised wiring is needed.

Generally, a reproduction unit that decodes MPEG2 or H.264 video signals adjusts a time from a start of decoding content until output of digital video signals, by using a PTS (Presentation Time Stamp). However, the timing of digital video signal output is sometimes changed due to jitter and inadequate accuracy of a reference clock signal. This causes such a problem that even when the same content is input to a plurality of reproduction units at the same time, video signals to be displayed do not synchronize accurately, video output timing varies among the plurality of reproduction units, and the quality of videos displayed by the plurality of display units is degraded. At a time of start of content especially, a difference between timing of display by the plurality of display units may be conspicuous, even if it is a difference of one frame in a case of some kinds of content.

The present invention is made to solve the problems in the conventional arts, and its object is to provide a video information reproduction system that can accurately synchronize a plurality of video signals output from a plurality of video information reproduction devices without making the configuration complex and to provide the video information reproduction device.

Means of Solving the Problem

A video information reproduction system according to the present invention includes a first video information reproduction device and a second video information reproduction device. The first video information reproduction device includes: a first storage unit configured to store first content data and a first reproduction time; a first clock generator that generates a first decode reference clock signal; a first time measurement unit; a first decoder that performs decoding to generate content data including a first video signal, a first video clock signal, and a first vertical synchronization signal, from the first content data on a basis of the first decode reference clock signal; a first synchronization signal processor that generates a first counter value to be incremented each time the first vertical synchronization signal is output; and a first control unit that makes a first comparison by comparing a first current time acquired from the first time measurement unit and the first reproduction time stored in the first storage unit and controls the first decoder on a basis of a result of the first comparison. The second video information reproduction device includes: a second storage unit configured to store second content data and a second reproduction time; a second clock generator that generates a second decode reference clock signal; a second time measurement unit; a second decoder that performs decoding to generate content data including a second video signal, a second video clock signal, and a second vertical synchronization signal, from the second content data on a basis of the second decode reference clock signal; a second synchronization signal processor that generates a second counter value to be incremented each time the second vertical synchronization signal is output; and a second control unit that makes a second comparison by comparing a second current time acquired from the second time measurement unit and the second reproduction time stored in the second storage unit and controls the second decoder on a basis of a result of the second comparison. The first synchronization signal processor generates a phase synchronization signal by combining the first vertical synchronization signal with a signal based on the first counter value and sends the phase synchronization signal to the second synchronization signal processor; the second synchronization signal processor makes a third comparison by comparing a first vertical synchronization signal separated from the phase synchronization signal and the second vertical synchronization signal on a basis of the second video clock signal, the second clock generator changes a frequency of the second decode reference clock signal on a basis of a result of the third comparison, and updates the second counter value to the first counter value obtained from a signal based on the first counter value separated from the phase synchronization signal; the first control unit notifies the second control unit of the first current time based on the first counter value obtained from the phase synchronization signal; and the second control unit updates the second current time based on the second counter value, to the notified first current time.

Further, a video information reproduction device according to the present invention is-a master device in a plurality of video information reproduction devices included in a video information reproduction system. The video information reproduction device includes: a storage unit configured to store content data and a reproduction time; a clock generator that generates a decode reference clock signal; a time measurement unit; a decoder that performs decoding to generate content data including a video signal, a video clock signal, and a vertical synchronization signal, from the content data stored in the storage unit on a basis of the decode reference clock signal; a synchronization signal processor that generates a counter value to be incremented each time the vertical synchronization signal is output; and a control unit that makes a comparison by comparing a current time acquired from the time measurement unit and the reproduction time stored in the storage unit and controls the decoder on a basis of a result of the comparison. The synchronization signal processor generates a phase synchronization signal by combining the vertical synchronization signal and a signal based on the counter value and sends the phase synchronization signal to a video information reproduction device as a slave device among the plurality of video information reproduction devices; and the control unit sends a current time based on a counter value obtained from the phase synchronization signal, to the video information reproduction device as the slave device.

Furthermore, a video information reproduction device according to the present invention is a slave device in a plurality of video information reproduction devices included in a video information reproduction system. The video information reproduction device includes: a storage unit configured to store content data and reproduction time; a clock generator that generates a decode reference clock signal; a time measurement unit; a decoder that performs decoding to generate content data including a video signal, a video clock signal, and a vertical synchronization signal, from the content data stored in the storage unit on a basis of the decode reference clock signal; a synchronization signal processor that generates a counter value that is incremented each time the vertical synchronization signal is output; and a control unit that makes a first comparison by comparing a current time acquired from the time measurement unit and the reproduction time stored in the storage unit and controls the decoder on a basis of a result of the first comparison. The synchronization signal processor receives a phase synchronization signal sent from a video information reproduction device as a master device of the plurality of video information reproduction devices; a second comparison is made by comparing a vertical synchronization signal separated from the phase synchronization signal and the vertical synchronization signal on a basis of the video clock signal, and the clock generator changes a frequency of the decode reference clock signal on a basis of a result of the second comparison; a counter value generated by the synchronization signal processor is updated to a counter value obtained from a signal based on a counter value separated from the phase synchronization signal; and the control unit that updates a current time based on a counter value obtained from the phase synchronization signal to a current time whose notification is sent from the master device.

Another video information reproduction system according to the present invention includes a first video information reproduction device and a second video information reproduction device. The first video information reproduction device includes: a first storage unit configured to store first content data and a first reproduction time; a first clock generator that generates a first decode reference clock signal; a first time measurement unit; a first decoder that performs decoding to generate content data including a first video signal, a first video clock signal, and a first vertical synchronization signal, from the first content data on a basis of the first decode reference clock signal; a first synchronization signal processor that generates a first counter value increasing when the first vertical synchronization signal is output; and a first control unit that makes a first comparison by comparing a first current time acquired from the first time measurement unit and the first reproduction time stored in the first storage unit and controls the first decoder on a basis of a result of the first comparison. The second video information reproduction device includes: a second storage unit configured to store second content data and a second reproduction time; a second clock generator that generates a second decode reference clock signal; a second decoder that performs decoding to generate content data including a second video signal, a second video clock signal, and a second vertical synchronization signal, from the second content data on a basis of the second decode reference clock signal; a second synchronization signal processor that generates a second counter value increasing when the second vertical synchronization signal is output; and a second control unit controlling the second decoder. The first synchronization signal processor generates a phase synchronization signal by combining the first vertical synchronization signal with a signal based on the first counter value and sending the phase synchronization signal to the second synchronization signal processor; the second synchronization signal processor makes a second comparison by comparing a first vertical synchronization signal separated from the phase synchronization signal and a second vertical synchronization signal on a basis of the second video clock signal, and the second clock generator changes the frequency of the second decode reference clock signal on a basis of a result of the second comparison, and updates the second counter value to a first counter value obtained from a signal based on a first counter value separated from the phase synchronization signal; the first control unit notifies the second control unit of a first counter value obtained from the phase synchronization signal and a first control counter value controlling the first decoder on a basis of a first reproduction time; and the second control unit makes a third comparison by comparing the second counter value and the first control counter value whose notification is provided, and controls the second decoder on a basis of a result of the third comparison.

Effect of the Invention

According to the present invention, a second decode reference clock signal in a second video information reproduction device is compared with a phase synchronization signal corresponding to a first decode reference clock signal in a first video information reproduction device, and the frequency of the second decode reference clock signal is changed on the basis of the result of the comparison. For this reason, the accuracy of synchronization between the first video signal output from the first video information reproduction device and the second video signal output from the second video information reproduction device can be improved without making the configuration of the system complex.

BRIEF DESCRIPTION OF THE DRAWINGS

FIG. 19 is a flowchart showing counter information notification processing of the control unit of the video information reproduction device as the master device according to the fifth embodiment.

FIG. 20 is a flowchart showing reproduction processing of the control unit of the video information reproduction device as a slave device according to the fifth embodiment.

MODE FOR CARRYING OUT THE INVENTION

<1> First Embodiment

Figure 1:
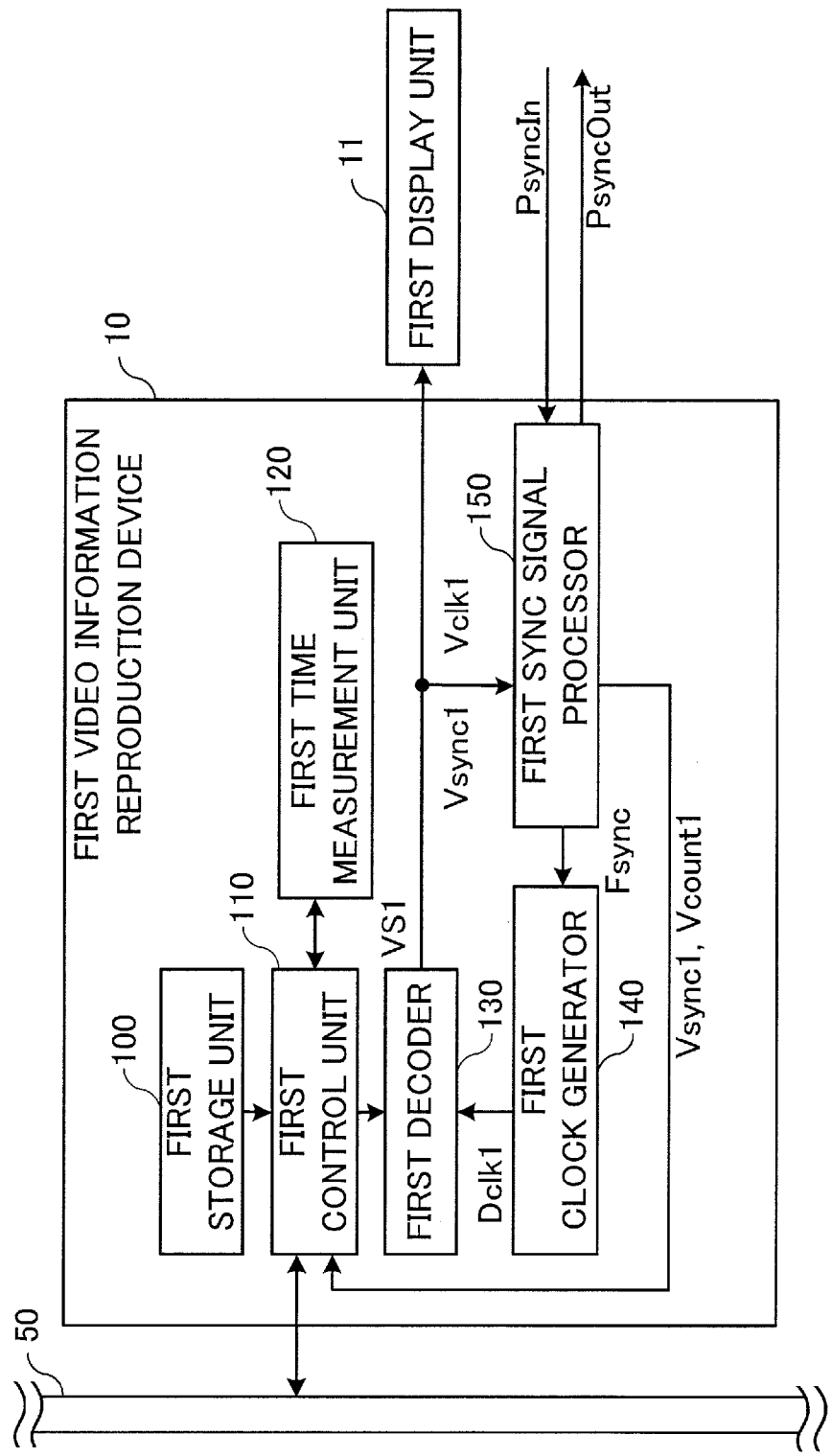
FIG. 1 is a block diagram schematically showing a configuration of a first video information reproduction device according to the first embodiment of the present invention.

FIG. 1 is a block diagram schematically showing a configuration of a first video information reproduction device 10 according to the first embodiment of the present invention. As shown in FIG. 1, the first video information reproduction device 10 includes a first storage unit 100, a first control unit 110, a first time measurement unit 120, a first decoder 130, a first clock generator 140, and a first synchronization signal processor 150. When the first video information reproduction device 10 as a single device is described, the first video information reproduction device 10, the first storage unit 100, the first control unit 110, the first time measurement unit 120, the first decoder 130, the first clock generator 140, the first synchronization signal processor 150, and the first display unit 11 are also referred to as a video information reproduction device 10, a storage unit 100, a control unit 110, a time measurement unit 120, a decoder 130, a clock generator 140, a synchronization signal processor 150, and a display unit 11 respectively.

The first video information reproduction device 10 supplies the first display unit 11 with a signal for displaying video on the first display unit 11. The first storage unit 100 stores content data and a reproduction time (e.g., a reproduction start time) indicating a time at which the content data is reproduced. The first clock generator 140 generates a first decode reference clock signal Dclk1. The first time measurement unit 120 generates a first current time (first clock time). The first decoder 130 performs decoding on the content data on the basis of the first decode reference clock signal Dclk1 to generate a first video signal, a first video clock signal Vclk1 that is used to send the first video signal, and a first vertical synchronization signal Vsync1 that is used to reproduce the first video signal, and outputs the first video signal and the first vertical synchronization signal Vsync1 to the first display unit 11 on the basis of the first video clock signal Vclk1. That is, the first decoder 130 performs decoding to generate content data including the first video signal, the first video clock signal Vclk1, and the first vertical synchronization signal Vsync1 from first content data on the basis of the first decode reference clock signal Dclk1, and outputs the first video signal and the first vertical synchronization signal Vsync1 to the first display unit 11 on the basis of the first video clock signal Vclk1. The first synchronization signal processor 150 generates a first counter value Vcount1, the value of which is incremented each time the first vertical synchronization signal Vsync1 is output. The first control unit 110 compares the first current time acquired from the first time measurement unit 120 with the reproduction time stored in the first storage unit 100 and controls the first decoder 130 on the basis of the result of this comparison.

The first storage unit 100 stores content data and content reproduction schedule information sent from a network 50 on the basis of the control by the first control unit 110. The first control unit 110 sends the content data stored in the first storage unit 100 to the first decoder 130 and controls the first decoder 130 so that a video based on the content is displayed by the first display unit 11 on the basis of the reproduction schedule information. Such control by the first control unit 110 is referred to as content reproduction processing. In addition, the first control unit 110 performs processing (time correction processing) to associate (e.g., match) the time based on the first time measurement unit 120 of the first video information reproduction device 10 with the time in another video information reproduction device through the network 50. The first time measurement unit 120 generates first time information of the first video information reproduction device 10. The first time information is referred to by the first control unit 110 as the first current time. Moreover, in the time correction processing, if the notification of a request to update the first time information is made from the first control unit 110, the first time measurement unit 120 changes (adjusts) the first time information and generates the first current time based on the changed first time information.

The first decoder 130 receives the content data sent from the first control unit 110 as an input and generates a digital video signal VS1 on the basis of the first decode reference clock signal Dclk1 generated in the first clock generator 140. Here, the digital video signal VS1 includes at least a first video clock signal Vclk1 which is used as a criterion for a speed of sending the first video signal, a first vertical synchronization signal Vsync1 indicating the beginning and the end of a video frame, and a horizontal synchronization signal Hsync1 indicating the beginning and the end of a video data line, in addition to RGB data (data for managing video color information by using a combination of red (R), green (G), and blue (B)) in the first video signal. The first decoder 130 outputs the digital video signals (the first video signal, the first vertical synchronization signal Vsync1, the horizontal synchronization signal Hsync1, and the like) to the first display unit 11 on the basis of the first video clock signal Vclk1. When receiving the digital video signal VS1, the first display unit 11 displays the content on a frame-by-frame basis on the basis of the first vertical synchronization signal Vsync1. Since the RGB data and the horizontal synchronization signal Hsync1 are known technical terms, their detailed description will be omitted.

The first synchronization signal processor 150 has a function for reproducing content by a plurality of video information reproduction devices in synchronization with each other. The first synchronization signal processor 150 generates a first counter value Vcount1. The first counter value Vcount1 is a value incremented (counted up) by one at the timing of the first vertical synchronization signal Vsync1 sent from the first decoder 130. That is, the value of the first counter value Vcount1 is incremented each time the first vertical synchronization signal Vsync1 is output from the first decoder 130. In the first embodiment, for example, the first counter value Vcount1 has 8 bits (the number of bits is fixed to 8 bits) and is a value counted from 0 to 255. The first synchronization signal processor 150 sends the first vertical synchronization signal Vsync1 and the first counter value Vcount1 to the first control unit 110. If the first video information reproduction device 10 of a plurality of video information reproduction devices functions as a master device (a master), the first video information reproduction device 10 generates a phase synchronization signal Psync (PsyncOut in FIG. 1) containing the first vertical synchronization signal Vsync1 and the first counter value Vcount1 and sends it to a video information reproduction device as a slave device (a slave). If the first video information reproduction device 10 functions as the slave device, the first video information reproduction device 10 receives the phase synchronization signal Psync (PsyncIn in FIG. 1) sent from the video information reproduction device as the master device. At this time, the first synchronization signal processor 150 notifies the first clock generator 140 of clock correction information Fsync based on the phase synchronization signal Psync.

Figure 2:
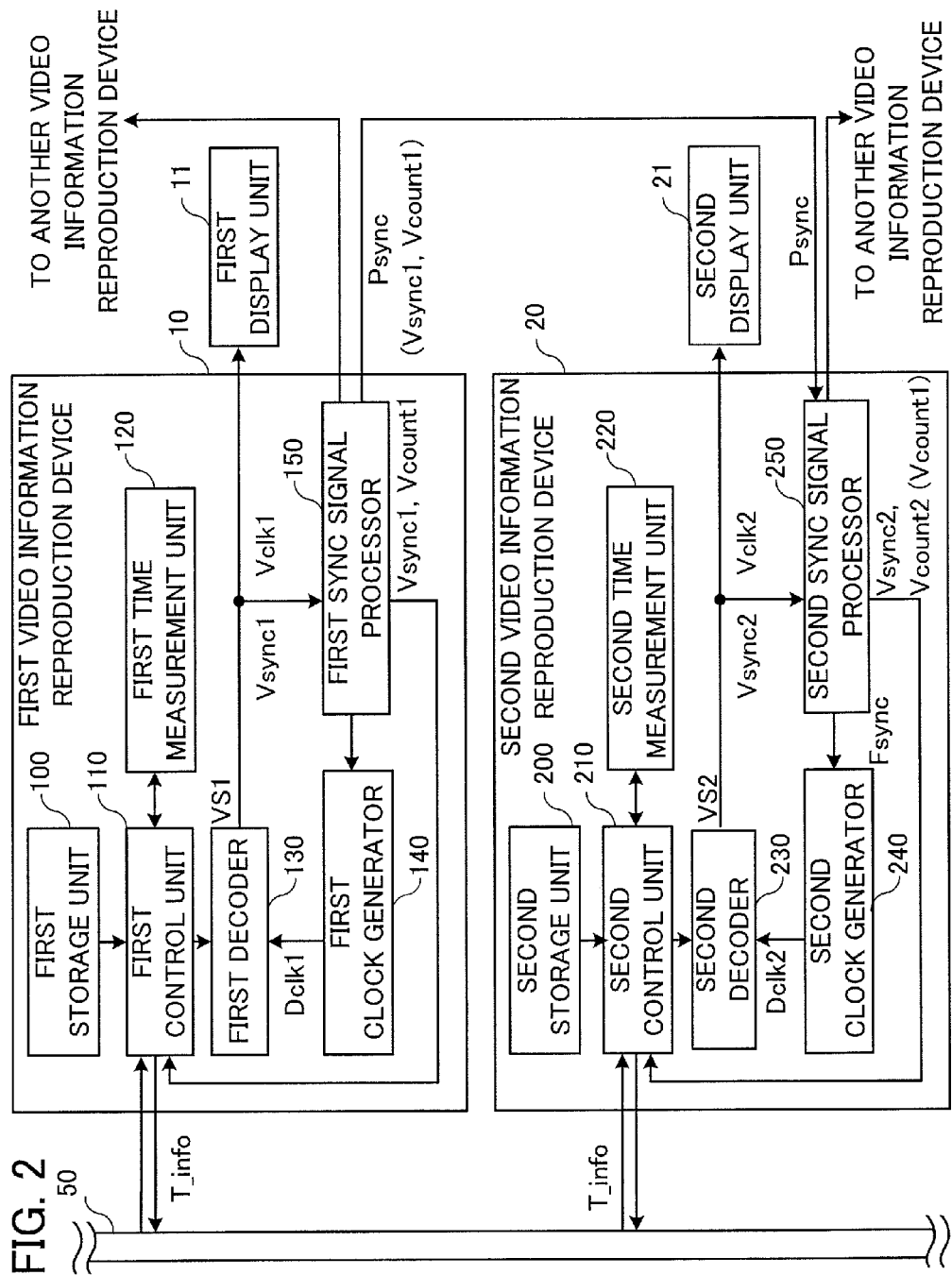
FIG. 2 is a block diagram schematically showing a configuration of a video information reproduction system according to the first embodiment.

FIG. 2 is a block diagram schematically showing a configuration of the video information reproduction system according to the first embodiment. Here, the first video information reproduction device 10 and a second video information reproduction device 20 form a digital signage system as the video information reproduction system. However, the digital signage system can have three or more video information reproduction devices and three or more display units.

In the first embodiment, the first video information reproduction device 10 operates as the master device, and the second video information reproduction device 20 operates as the slave device, but the present invention is not limited to this. The settings of the master device and the slave device can be determined on the basis of mode information indicating the settings of the master device and the slave device, stored in the first storage unit 100 and the second storage unit 200 at startup of the digital signage system or can be determined on the basis of mode information specified through a network by a different device. The video information reproduction system in FIG. 2 is formed by the two video information reproduction devices, but the present invention is not limited to such a configuration. For example, the present invention can also be applied to a video information reproduction system including three or more video information reproduction devices. Since the description of the first video information reproduction device 10 is the same as the description of FIG. 1, components in FIG. 2 that are the same as the components in FIG. 1 are assigned the same reference characters as the reference characters shown in FIG. 1.

As shown in FIG. 2, the second video information reproduction device 20 includes a second storage unit 200, a second control unit 210, a second time measurement unit 220, a second decoder 230, a second clock generator 240, and a second synchronization signal processor 250. When the second video information reproduction device 20 as a single device is described, the second video information reproduction device 20, the second storage unit 200, the second control unit 210, the second time measurement unit 220, the second decoder 230, the second clock generator 240, the second synchronization signal processor 250, and the second display unit 21 are also referred to as a video information reproduction device 20, a storage unit 200, a control unit 210, a time measurement unit 220, a decoder 230, a clock generator 240, a synchronization signal processor 250, and a display unit 21.

The second video information reproduction device 20 supplies the second display unit 21 with a signal for displaying video on the second display unit 21. The second storage unit 200 stores content data and a reproduction time (e.g., a reproduction start time) indicating the time at which the content data is reproduced. The second clock generator 240 generates a second decode reference clock signal Dclk2. The second time measurement unit 220 generates a second current time (second clock time). The second decoder 230 performs decoding on the content data on the basis of the second decode reference clock signal Dclk2, generates a second video signal, a second video clock signal Vclk2 that is used to send the second video signal, and a second vertical synchronization signal Vsync2 that is used to reproduce the second video signal, and outputs the second video signal and the second vertical synchronization signal Vsync2 to the second display unit 21 on the basis of the second video clock signal Vclk2. That is, the second decoder 230 performs decoding to generate content data including the second video signal, the second video clock signal Vclk2, and the second vertical synchronization signal Vsync2 from second content data on the basis of the second decode reference clock signal Dclk2 and outputs the second video signal and the second vertical synchronization signal Vsync2 to the second display unit 21 on the basis of the second video clock signal Vclk2. The second synchronization signal processor 250 generates a second counter value Vcount2, the value of which is incremented each time the second vertical synchronization signal Vsync2 is output. The second control unit 210 compares the second current time acquired from the second time measurement unit 220 with the reproduction time stored in the second storage unit 200 and controls the second decoder 230 on the basis of the result of this comparison.

The second storage unit 200 stores content data and content reproduction schedule information sent from the network 50 on the basis of the control by the second control unit 210. The second control unit 210 sends the content data stored in the second storage unit 200 to the second decoder 230 and controls the second decoder 230 so that a video based on the content is displayed by the second display unit 21 on the basis of the reproduction schedule information. Such control by the second control unit 210 is referred to as content reproduction processing. The second control unit 210 also performs processing (time correction processing) to associate the time based on the second time measurement unit 220 of the second video information reproduction device 20 with a time in another video information reproduction device through the network 50. Here, the second control unit 210 can perform the time correction processing by receiving the notification of time correction information T_info made by the first control unit 110 of the first video information reproduction device 10. The second time measurement unit 220 generates second time information of the second video information reproduction device 20. The second time information is referred to by the second control unit 210 as a second current time. Moreover, in the time correction processing, if the notification of a request to update the second time information is made from the second control unit 210, the second time measurement unit 220 changes (adjusts) the second time information and generates a second current time based on the changed second time information.

The second decoder 230 receives the content data sent from the second control unit 210 as an input and generates a digital video signal VS2 on the basis of the second decode reference clock signal Dclk2 generated in the second clock generator 240. Here, the digital video signal VS2 includes at least a second video clock signal Vclk2, a second vertical synchronization signal Vsync2, and a horizontal synchronization signal Hsync2, as well as the RGB data in the second video signal. The second decoder 230 outputs the digital video signals (the video signal and the like), the second vertical synchronization signal Vsync2, and the horizontal synchronization signal Hsync2 to the second display unit 21 on the basis of the second video clock signal Vclk2. When receiving the digital video signal VS2, the second display unit 21 displays the content on a frame-by-frame basis on the basis of the second vertical synchronization signal Vsync2.

The second synchronization signal processor 250 has a function for reproducing content by the second video information reproduction device 20 and the first video information reproduction device 10 in synchronization with each other. The second synchronization signal processor 250 generates a second counter value Vcount2. The second counter value Vcount2 is a value incremented (counted up) by one at the timing of the second vertical synchronization signal Vsync2 sent from the second decoder 230. That is, the value of the second counter value Vcount2 is incremented each time the second vertical synchronization signal Vsync2 is output from the second decoder 230. In the first embodiment, for example, the second counter value Vcount2 has 8 bits (the number of bits is fixed to 8 bits) and is a value counted from 0 to 255. The second synchronization signal processor 250 also sends the second vertical synchronization signal Vsync2 and the second counter value Vcount2 to the second control unit 210. Moreover, if the second video information reproduction device 20 functions as a slave device (a slave) among a plurality of video information reproduction devices, the second synchronization signal processor 250 receives the phase synchronization signal Psync (PsyncOut in FIG. 1) sent from the first synchronization signal processor 150 of the first video information reproduction device 10 and notifies the second clock generator 240 of clock correction information Fsync based on the phase synchronization signal Psync.

As described above, in FIG. 2, the first video information reproduction device 10 and the second video information reproduction device 20 are video information reproduction devices having the same configuration, but one works as the master device and the other works as the slave device.

Figure 3:
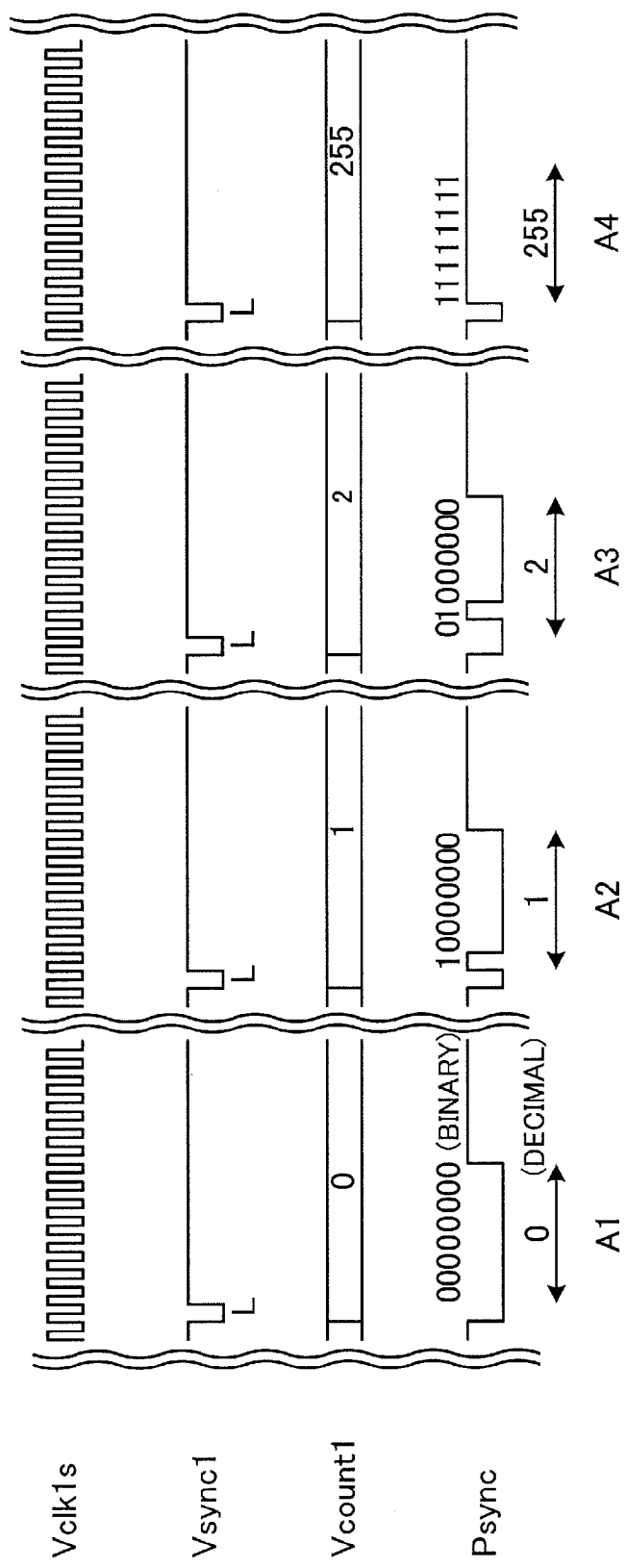
FIG. 3 is a timing chart showing signals in the first video information reproduction device according to the first embodiment.

FIG. 3 is a timing chart showing signals in the first video information reproduction device 10 as the master device according to the first embodiment. FIG. 3 schematically shows an example of a first frequency divided clock signal Vclk1s, a first vertical synchronization signal Vsync1, a first counter value Vcount, and a phase synchronization signal Psync in the first synchronization signal processor 150 of the first video information reproduction device 10 as the master device. The first vertical synchronization signal Vsync1 is a synchronization signal output from the first decoder 130. The first frequency divided clock signal Vclk1s is a clock signal obtained by frequency-dividing the first video clock signal Vclk1 output from the first decoder 130. The first counter value Vcount1 is an 8-bit counter value incremented at the timing of the first vertical synchronization signal Vsync1. The first counter value Vcount1 is held in a register or the like and is referred to by the first control unit 110. The phase synchronization signal Psync is generated by superimposing the first counter value Vcount1 on the first vertical synchronization signal Vsync1, and it is notified from the first synchronization signal processor 150 to the second synchronization signal processor 250 of the second video information reproduction device 20 as the slave device.

The first synchronization signal processor 150 increments the first counter value Vcount1 each time a falling edge of the first vertical synchronization signal Vsync1 is detected on the basis of the first frequency divided clock signal Vclk1s. Next, the first synchronization signal processor 150 generates the phase synchronization signal Psync by superimposing the first counter value Vcount1 on the detected first vertical synchronization signal Vsync1 in a period of 8 clocks of the first frequency divided clock signal Vclk1s. In other words, the phase synchronization signal Psync has a waveform generated by obtaining a waveform by extending a "L" (low) section of the first vertical synchronization signal Vsync1 by 8 clocks of the frequency divided clock signal Vclk1s and by adding, to the 8-clock-extended waveform section (a period indicated by a double-headed arrow in FIG. 3), a waveform of 8 bits which is information on the first counter value Vcount1. FIG. 3 shows that sections A1, A2, A3, and A4 respectively contain 0, which is "00000000" in binary (in FIG. 3, the bits are shown in reverse order), 1, which is "00000001" in binary (in FIG. 3, the bits are shown in reverse order), 2, which is "00000010" in binary (in FIG. 3, the bits are shown in reverse order), and 255, which is "11111111" in binary (in FIG. 3, the bits are shown in reverse order), as the first counter value Vcount1. After reaching "255", the first counter value Vcount1 returns to "0" and is incremented again.

Figure 4:
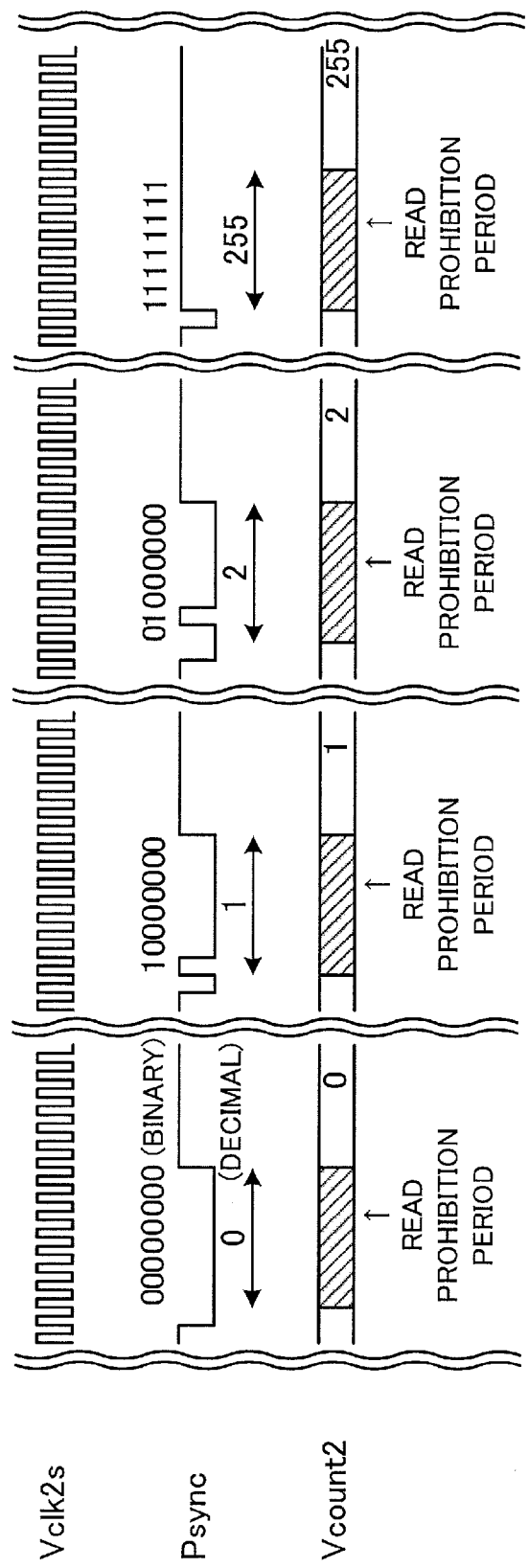
FIG. 4 is a timing chart showing signals in a second video information reproduction device according to the first embodiment.

FIG. 4 is a timing chart showing signals in the second video information reproduction device 20 as the slave device according to the first embodiment. FIG. 4 schematically shows an example of a second frequency divided clock signal Vclk2s, the phase synchronization signal Psync, and a second counter value Vcount2 in the second synchronization signal processor 250 of the second video information reproduction device 20 as the slave device. The second frequency divided clock signal Vclk2s is a clock signal obtained by frequency-dividing the second video clock signal Vclk2 output from the second decoder 230. The phase synchronization signal Psync is a signal whose notification is sent from the first video information reproduction device 10 as the master device. The second counter value Vcount2 is an 8-bit counter value incremented at the timing of the second vertical synchronization signal Vsync2. The second counter value Vcount2 is stored in the register or the like and is referred to by the second control unit 210. In the first embodiment, however, the second video information reproduction device 20 works as the slave device. For this reason, the second counter value Vcount2 is not a value incremented at the timing of the second vertical synchronization signal Vsync2 and is changed to a value of the first counter value Vcount1 extracted from the phase synchronization signal Psync.

After the falling edge of the phase synchronization signal Psync is detected on the basis of the second frequency divided clock signal Vclk2s, the second synchronization signal processor 250 receives data of 8 clocks of the second frequency divided clock signal Vclk2s from the phase synchronization signal Psync, extracts the first counter value Vcount1 to be superimposed on the phase synchronization signal Psync, and stores it as the second counter value Vcount2 in a register or the like. Here, there is a difference of 8 clocks of the second frequency divided clock signal Vclk2s between a case where the second counter value Vcount 2 is generated after the falling edge of the phase synchronization signal Psync is detected on the basis of the second video clock signal Vclk2 and another case where the second counter value Vcount2 is generated by extracting the first counter value Vcount1 from the phase synchronization signal Psync. For this reason, the second synchronization signal processor 250 provides a read prohibition period corresponding to 8 clocks of the second frequency divided clock signal Vclk2s, in the second counter value Vcount2, as shown in FIG. 4. Here, if the second control unit 210 tries to refer to the second counter value Vcount2 in the read prohibition period, the second control unit 210 cannot refer to the counter value. For this reason, it can be configured so that an indefinite value is set for the read prohibition period by the second synchronization signal processor 250 and the second control unit 210 accesses again if the second control unit 210 accesses in the read prohibition period.

Synchronization of the second decode reference clock signal Dclk2 will next be described. The second decoder 230 receives the second decode reference clock signal Dclk2 generated in the second clock generator 240, generates a second video clock signal Vclk2 and a second vertical synchronization signal Vsync2, and outputs them to the second display unit 21. Accordingly, if the second decode reference clock signal Dclk2 generated in the slave device synchronizes with the first decode reference clock signal Dclk1 generated in the master device, the first vertical synchronization signal Vsync1 and the second vertical synchronization signal Vsync2 synchronize with each other, and points in time of output of the digital video signals (the video signal, the vertical synchronization signal, and the like) agree with each other, between the master device and the slave device.

Figures 5, 6:
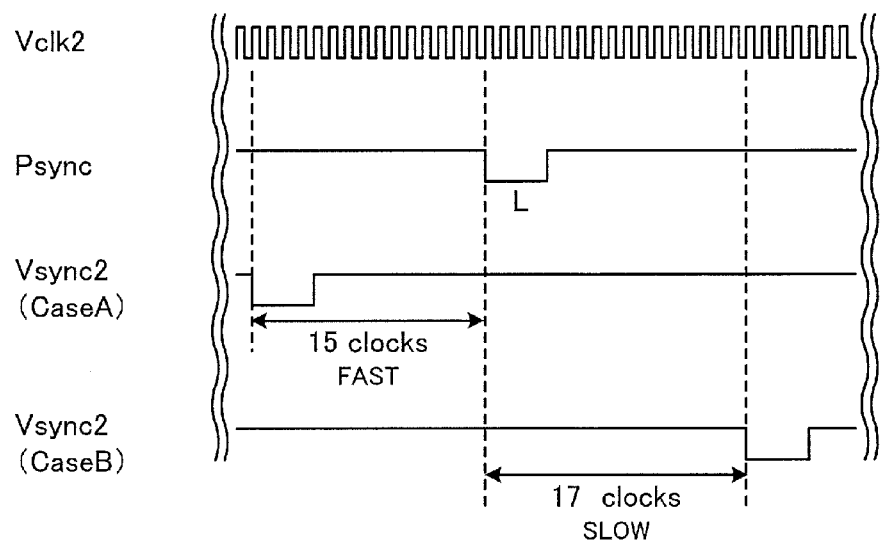
FIG. 5 is a timing chart showing signals in the second video information reproduction device according to the first embodiment.
FIG. 6 is a diagram showing an example of a reproduction list in the first embodiment.

FIG. 5 is a timing chart showing signals in the second video information reproduction device 20 as the slave device according to the first embodiment. FIG. 5 schematically shows an example of the second video clock signal Vclk2, the phase synchronization signal Psync, and the second vertical synchronization signal Vsync2 in the second synchronization signal processor 250. The second video clock signal Vclk2 is a video clock signal output from the second decoder 230. The phase synchronization signal Psync is a phase synchronization signal whose notification is sent from the first video information reproduction device 10 as the master device. The second vertical synchronization signal Vsync2 is a vertical synchronization signal output from the second decoder 230.

On the phase synchronization signal Psync, the first vertical synchronization signal Vsync1 and the first counter value Vcount1 of the first video information reproduction device 10 as the master device are superimposed. The first vertical synchronization signal Vsync1 and the first counter value Vcount1 are superimposed in a period of a fall of the phase synchronization signal Psync. The second synchronization signal processor 250 detects times when the phase synchronization signal Psync falls, as the timing of the first vertical synchronization signal Vsync1. Therefore, the second synchronization signal processor 250 compares times when the second vertical synchronization signal Vsync2 falls with the timing of the first vertical synchronization signal Vsync1 (times when the phase synchronization signal Psync falls) with reference to the second video clock signal Vclk2. For example, in Case A in FIG. 5, the falling edge of the second vertical synchronization signal Vsync2 is ahead of the falling edge of the phase synchronization signal Psync by 15 clocks of the second video clock signal Vclk2. For this reason, the second synchronization signal processor 250 sends clock correction information Fsync to lower the frequency of the second clock generator 240 in order to delay the second decode reference clock signal Dclk2 so that the second vertical synchronization signal Vsync2 is output later (that is, the digital video signal is output later in the second decoder 230). In Case B in FIG. 5, the falling edge of the second vertical synchronization signal Vsync2 is behind the phase synchronization signal Psync by 17 clocks of the second video clock signal Vclk2. For this reason, the second synchronization signal processor 250 sends clock correction information Fsync in order to increase the frequency of the second clock generator 240 to advance the decode reference clock signal Dclk2 so that the second vertical synchronization signal Vsync2 is output earlier (that is, the digital video signal is output earlier in the second decoder 230).

As described above, the second decode reference clock signal Dclk2 is adjusted by controlling the frequency of the second clock generator 240 of the slave device so as to match the timing of second vertical synchronization signal Vsync2 in the slave device to the timing of the first vertical synchronization signal Vsync1 of the master device, included in the phase synchronization signal Psync. By doing this, the second vertical synchronization signal Vsync2 of the slave device can synchronize with the first vertical synchronization signal Vsync1 of the master device.

Synchronization of the second time information of the second time measurement unit 220 in the slave device will next be described. The second control unit 210 refers to the content reproduction schedule on the basis of the "current time acquired" from the second time measurement unit 220. Accordingly, if the second time information of the slave device synchronizes with the first time information of the master device, the content reproduction schedules agree with each other between the master device and the slave device. A mechanism for achieving synchronization between the second current time of the second time measurement unit 220 and the timing of the second vertical synchronization signal Vsync2 will be described below.

When receiving the first vertical synchronization signal Vsync1 sent from the first synchronization signal processor 150, the first control unit 110 of the first video information reproduction device 10 as the master device acquires first time information from the first time measurement unit 120 as a first current time and determines whether the first time information should be corrected. Here, the determination of the correction is implemented by a method of making a determination by notifying of a target time (that is, an objective time of day) to be corrected via the network 50 and comparing the notified target time with the acquired first current time, a method of making a determination on the basis of a target time defined in a reproduction list stored in the first storage unit 100, a method of notifying of a target a target time at regular intervals of 10 minutes and comparing the notified target time with the acquired current time, or the like.

If the first time information of the master device is corrected, the second time information of the slave device needs to be corrected simultaneously to match the display content of the first display unit 11 and the display content of the second display unit 21. Accordingly, in order to correct the second time information of the second video information reproduction device 20 as the slave device together, the first video information reproduction device 10 as the master device notifies the second video information reproduction device 20 of time correction information T_info. The notification of the time correction information T_info will be described below.

The first control unit 110 acquires the first counter value Vcount1 from the first synchronization signal processor 150.

Next, the first control unit 110 generates the time correction information T_info and gives its notification to the second video information reproduction device 20 as the slave device. Here, the time correction information T_info includes a target time Time_M and an estimated counter value Vcount_M. The target time Time_T is time information set as the second time information of the second time measurement unit 220 and is defined in the form of "hour: minute:second". The estimated counter value Vcount_M is an estimated value of the first counter value Vcount1 generated by the first synchronization signal processor 150 at the time when the second time information of the second time measurement unit 220 is set as the target time Time_M. The first control unit 110 notifies the second video information reproduction device 20 of the time correction information T_info through the network 50.

Here, the target time Time_M is determined by taking into consideration a delay amount from when the time correction information T_info is notified through the network 50 until when it is set in the second time measurement unit 220. The estimated counter value Vcount_M is determined as the first counter value Vcount1 at the time when the target time Time_M is set in the second time measurement unit 220. For example, if the first current time is "12 (hours):12 (minutes): 00 (seconds):000 (milliseconds)", the first counter value Vcount1=20, and the second time information of the second time measurement unit 220 is corrected one second later in consideration of the network or processing load, the first control unit 110 determines the target time Time_M as "12 (hours):12 (minutes):01 (seconds):000 (milliseconds)" by adding one second to the first current time and determines the estimated counter value Vcount_M=50 by adding a counter value=30, which corresponds to one second, to the current first counter value Vcount1.

The processing of the second video information reproduction device 20 as the slave device will next be described. The second video information reproduction device 20 receives the notification of the time correction information T_info sent from the first video information reproduction device 10 as the master device. The second control unit 210 stores (holds) the target time Time_M and the estimated counter value Vcount_M included in the time correction information T_info. When receiving a notification of the phase synchronization signal Psync from the first synchronization signal processor 150 of the first video information reproduction device 10, the second synchronization signal processor 250 of the second video information reproduction device 20 extracts the first counter value Vcount1 of the master device superimposed on the phase synchronization signal Psync. If the device functions as the slave device, the second control unit 210 refers to the first counter value Vcount1 as the second counter value Vcount2. The second control unit 210 acquires the second counter value Vcount2 from the second synchronization signal processor 250 and compares it with the estimated counter value Vcount_M to be stored.

If the second counter value Vcount2 agrees with the estimated counter value Vcount_M, the second control unit 210 sets the time information of the stored target time Time_M in the second time measurement unit 220. As described above, since the second time information of the second time measurement unit 220 of the second video information reproduction device 20 is set as the target time Time_M at the timing of the estimated counter value Vcount_M, the first current time in the first video information reproduction device 10 synchronizes with the second current time in the second video information reproduction device 20.

The content reproduction processing of the first video information reproduction device 10 will next be described. The processing in the second video information reproduction device 20 is substantially the same as the processing in the first video information reproduction device 10.

When receiving the first vertical synchronization signal Vsync1 sent from the first synchronization signal processor 150, the first control unit 110 acquires the first current time from the first time measurement unit 120. The first current time is acquired in units of milliseconds. The first control unit 110 refers to the reproduction list based on the reproduction schedule information stored in the first storage unit 100 on the basis of the first current time.

FIG. 6 is a diagram showing an example of the reproduction list stored in the first storage unit 100 according to the first embodiment. In the first embodiment, the reproduction list includes information containing items of "preparation time", "reproduction time", "reproduction period", and "content name". As the "preparation time", information on a time at which preparation for reproduction of relevant content (pre-reproduction processing) is performed is defined in the form of "hour:minute:second". As the "reproduction time", information on a time at which reproduction of the relevant content is started (reproduction start processing) is defined in the form of "hour:minute:second". As the "reproduction period", information on a reproduction period of the relevant content is defined in units of seconds. As the "content name", data name of the relevant content is defined. The reproduction list may store the reproduction schedule information of one day or longer and may be updated at the beginning of each day through the network 50 or the like. By defining the reproduction list in units of hours, for example, and distributing the reproduction list through the network 50 or the like, it can be configured that the reproduction list displays reproduction schedule information on content with high real-time performance.

The first control unit 110 refers to items on the reproduction list sequentially to search for i satisfying that the "acquired first current time" is behind the "preparation time of No. i" and ahead of the "preparation time of No. (i+1)" in time, where i is an integer not smaller than 1. That is, i satisfying Preparation time of No. *i*<Acquired first current time<Preparation time of No. (*i*+1)

is searched for. Although the first current time is acquired in units of milliseconds, when the first current time is compared with the preparation time and the reproduction time in the reproduction list, processing of rounding down or up a value smaller than a second of the current time or the like is performed, if necessary. If the current time is after the "preparation time of No. i" on the reproduction list, the first control unit 110 reads data of "content name of No. i" from the first storage unit 100 and performs the pre-reproduction processing for the first decoder 130. The pre-reproduction processing means setting for starting decoding by the first decoder 130. For example, the first control unit 110 transfers data required for setting data format of the content to be reproduced and decoding a leading frame of the content to the input buffer of the first decoder 130. This makes the first decoder 130 ready for decoding the "content of No. i" and outputting the digital video signal containing the data of the leading frame of the content to the first display unit 11.

If the current time is after the "reproduction time of No. i" in the reproduction list, the first control unit 110 performs the reproduction start processing for the first decoder 130. The reproduction start processing means that the first control unit 110 notifies the first decoder 130 of pointer information or the like added to the data of the leading frame of the relevant content, among data of a plurality of frames decoded by the first decoder 130 in advance, for example. That is, the first control unit 110 causes the first decoder 130 to start outputting the digital video signal of the "content of No. i". The first decoder 130 to which the reproduction start processing is performed outputs the digital video signal including the data of the leading frame of the content to the first display unit 11 on the basis of the first video clock signal Vclk1. The first display unit 11 displays the content, from the leading frame of the content, on the basis of the digital video signal.

As described above, the first video information reproduction device 10 acquires the first current time on the basis of the first vertical synchronization signal Vsync1 corresponding to one frame of content, from the first synchronization signal processor 150, performs the pre-reproduction processing and the reproduction start processing for the first decoder 130, and outputs the content data decoded on the basis of the reproduction schedule to the first display unit 11. The second video information reproduction device 20 acquires the second current time on the basis of the second vertical synchronization signal Vsync2 corresponding to one frame of content, from the second synchronization signal processor 250, performs the pre-reproduction processing and the reproduction start processing for the second decoder 230, and outputs the content data decoded on the basis of the reproduction schedule to the second display unit 21. Accordingly, if the second decode reference clock signal Dclk2 and the second current time in the second video information reproduction device 20 synchronize with the first decode reference clock signal Dclk1 and the first current time in the first video information reproduction device 10, video information output to the first display unit 11 and video information output to the second display unit 21 can be synchronized.

Figure 7:
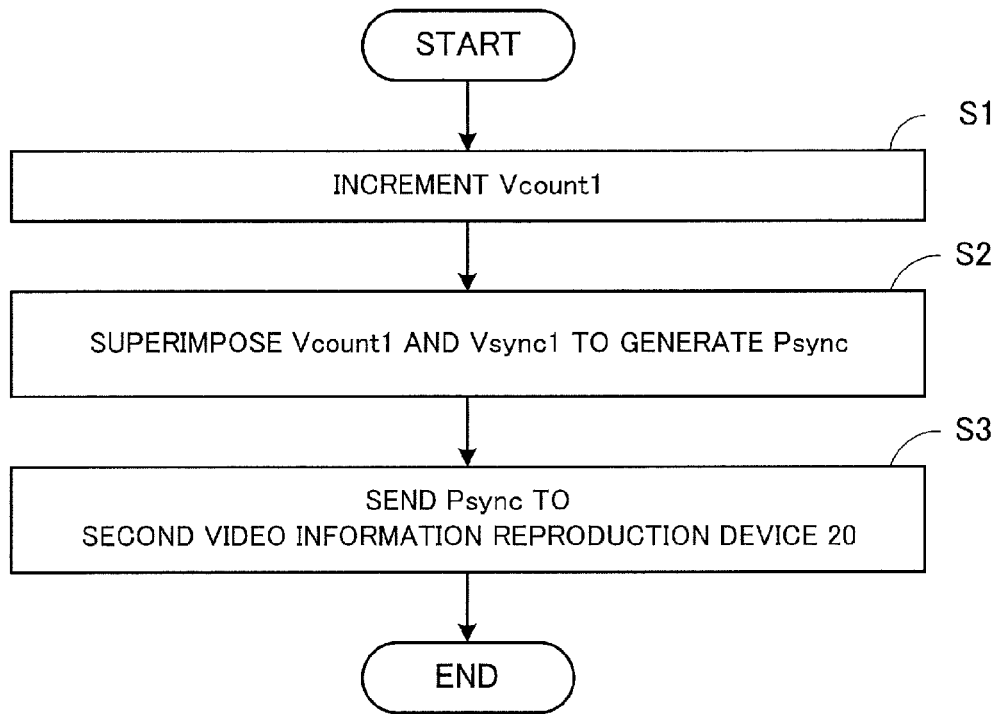
FIG. 7 is a flowchart showing an operation of a first synchronization signal processor of the first video information reproduction device according to the first embodiment.

FIG. 7 is a flowchart showing an operation of the first synchronization signal processor 150 of the first video information reproduction device 10 as the master device according to the first embodiment. By the operation illustrated in FIG. 7, the first synchronization signal processor 150 generates a phase synchronization signal Psync.

As shown in FIG. 2, FIG. 3, and FIG. 7, the first synchronization signal processor 150 first increments the first counter value Vcount1 each time the falling edge of the first vertical synchronization signal Vsync1 is detected on the basis of the first frequency divided clock signal Vclk1s (step S1). Next, the first synchronization signal processor 150 generates a phase synchronization signal Psync by superimposing the first vertical synchronization signal Vsync1 and the first counter value Vcount1 in a period of 8 clocks of the first frequency divided clock signal Vclk1s (step S2). The first synchronization signal processor 150 sends the generated phase synchronization signal Psync to the second synchronization signal processor 250 of the second video information reproduction device 20 as the slave device (step S3).

Figure 8:
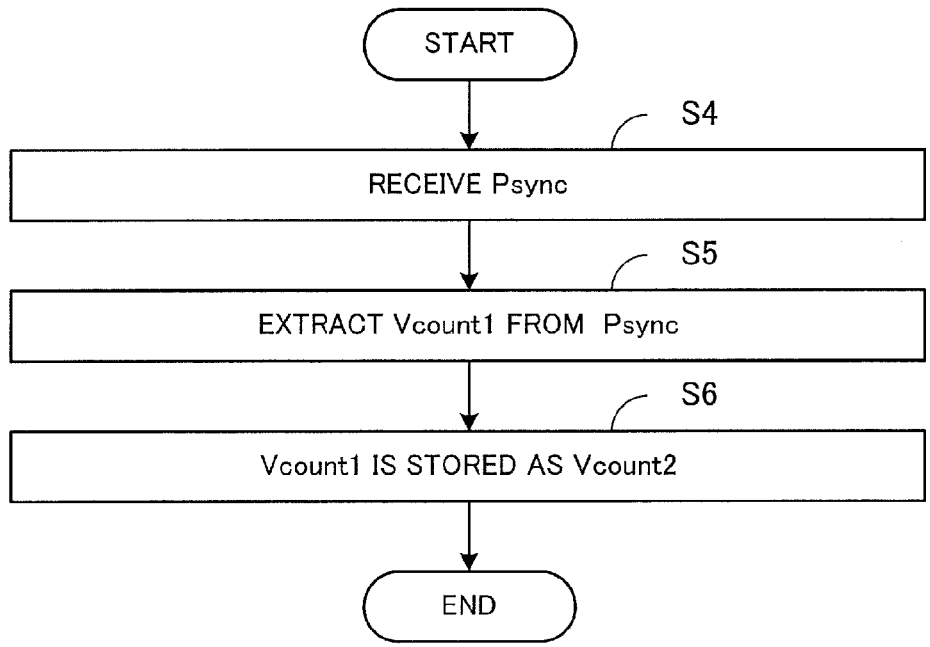
FIG. 8 is a flowchart showing an operation of a second synchronization signal processor of the second video information reproduction device according to the first embodiment.

FIG. 8 is a flowchart showing an operation of the second synchronization signal processor 250 of the second video information reproduction device 20 as the slave device according to the first embodiment. By the operation illustrated in FIG. 8, the second synchronization signal processor 250 generates the second counter value Vcount2 to be referred to by the second control unit 210.

As shown in FIG. 2 and FIG. 8, the second synchronization signal processor 250 receives the phase synchronization signal Psync sent from the first synchronization signal processor 150 of the first video information reproduction device 10 (step S4). The second synchronization signal processor 250 extracts the first counter value Vcount1 from the phase synchronization signal Psync (step S5). The second synchronization signal processor 250 stores the extracted first counter value Vcount1 as the second counter value Vcount2 in the register or the like (step S6).

Figure 9:
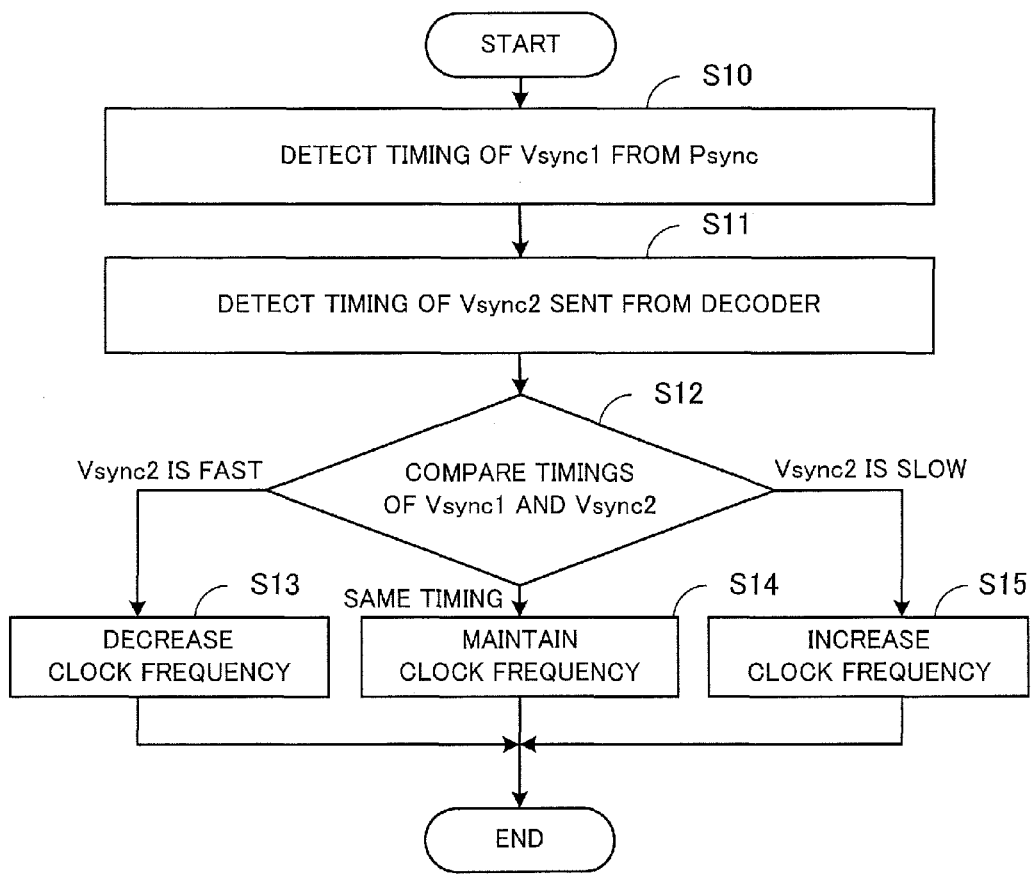
FIG. 9 is a flowchart showing an operation of the second synchronization signal processor of the second video information reproduction device according to the first embodiment.

FIG. 9 is a flowchart showing an operation of the second synchronization signal processor 250 of the second video information reproduction device 20 as the slave device according to the first embodiment. By the operation illustrated in FIG. 9, the second synchronization signal processor 250 corrects the frequency of the second decode reference clock signal Dclk2 generated by the second clock generator 240.

As shown in FIG. 2, FIG. 4, and FIG. 9, first, the second synchronization signal processor 250 detects the timing of the first vertical synchronization signal Vsync1 of the first video information reproduction device 10 from the phase synchronization signal Psync (step S10). Next, the second synchronization signal processor 250 detects the timing of the second vertical synchronization signal Vsync2 sent from the second decoder 230 (step S11). Then, the second synchronization signal processor 250 compares the timing of the two signals and determines the clock correction processing of the second decoder 230 on the basis of the result of this comparison (step S12). If the timing of the second vertical synchronization signal Vsync2 is ahead of the first vertical synchronization signal Vsync1, the second synchronization signal processor 250 sends a notification to the second clock generator 240 to lower the frequency of the second decode reference clock signal Dclk2 to the second decoder 230 (step S13). If the timing of the second vertical synchronization signal Vsync2 is the same as the timing of the first vertical synchronization signal Vsync1, the second synchronization signal processor 250 sends a notification to the second clock generator 240 to maintain the frequency of the second decode reference clock signal Dclk2 (step S14). If the timing of the second vertical synchronization signal Vsync2 is behind the first vertical synchronization signal Vsync1, the second synchronization signal processor 250 sends a notification to the second clock generator 240 to increase the frequency of the second decode reference clock signal Dclk2 (step S15).

Figure 10:
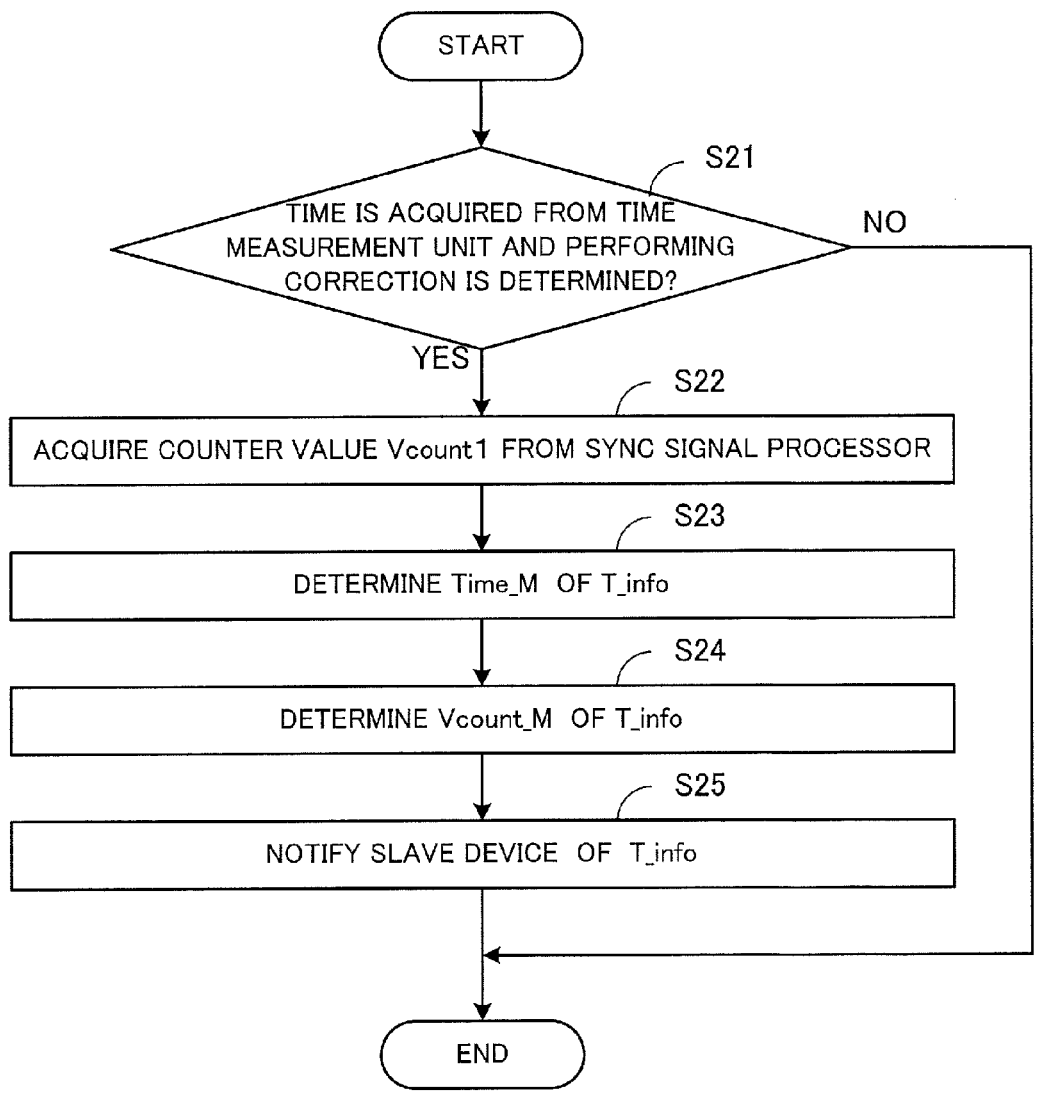
FIG. 10 is a flowchart showing time correction processing of a first control unit of the first video information reproduction device according to the first embodiment.

FIG. 10 is a flowchart showing the time correction processing of the first control unit 110 of the first video information reproduction device 10 as the master device according to the first embodiment. By the operation illustrated in FIG. 10, the first control unit 110 performs the time correction processing.

As shown in FIG. 2 and FIG. 10, the first control unit 110 starts the time correction processing when it receives the first vertical synchronization signal Vsync1 sent from the first synchronization signal processor 150. First, the first control unit 110 acquires the first current time from the first time measurement unit 120 and determines whether to perform a correction (step S21). If a correction is performed (YES in step S21), the first control unit 110 performs the processing of step S22 and subsequent steps; if no correction is performed (NO in step S21), the first control unit 110 ends the time correction processing.

If a correction is performed, the first control unit 110 acquires the first counter value Vcount1 from the first synchronization signal processor 150 (step S22). Next, the first control unit 110 determines the target time Time_M of the time correction information T_info whose notification is sent to the second video information reproduction device 20 (step S23). Then, the first control unit 110 determines the estimated counter value Vcount_M of the time correction information T_info whose notification is sent to the slave device (step S24). Next, the first control unit 110 notifies the second video information reproduction device 20 of the time correction information T_info including the target time Time_M and the estimated counter value Vcount_M, through the network 50 (step S25).

Figure 11:
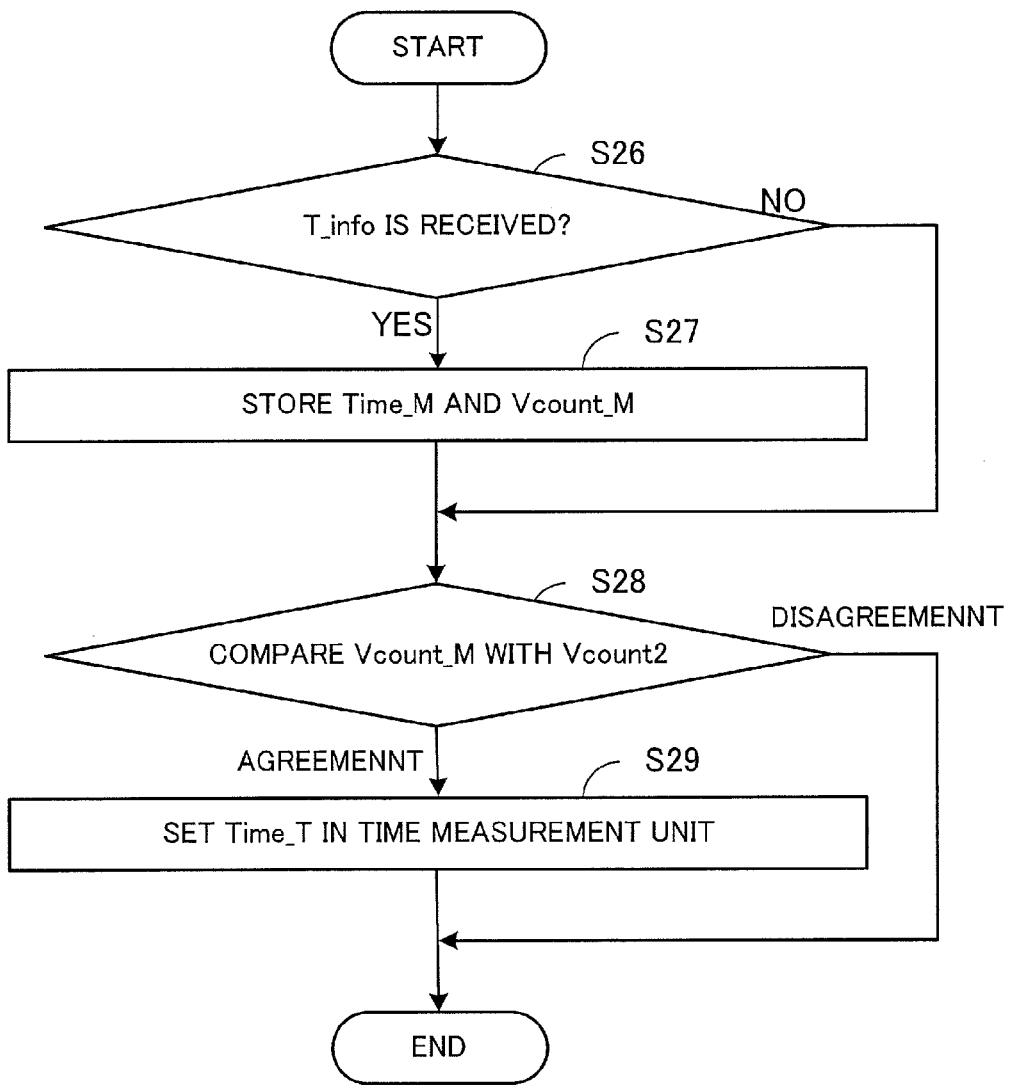
FIG. 11 is a flowchart showing time correction processing of a second control unit of the second video information reproduction device according to the first embodiment.

FIG. 11 is a flowchart showing the time correction processing of the second control unit 210 of the second video information reproduction device 20 as the slave device according to the first embodiment. By the operation illustrated in FIG. 11, the second control unit 210 performs the time correction processing. The second control unit 210 starts the time correction processing when it receives the first vertical synchronization signal Vsync1 of the master device, sent from the second synchronization signal processor 250.

As shown in FIG. 2 and FIG. 11, if the time correction information T_info sent from the first video information reproduction device 10 is received (YES in step S26), first, the second control unit 210 performs processing of step S27 and subsequent steps; if the time correction information T_info is not received (NO in step S27), the second control unit 210 performs processing of step S28 and subsequent steps. If the time correction information T_info is received, the second control unit 210 stores (holds) the target time Time_M and the estimated counter value Vcount_M included in the time correction information T_info (step S27). Next, the second control unit 210 acquires the second counter value Vcount2 sent from the second synchronization signal processor 250 and compares the acquired second counter value Vcount2 with the stored estimated counter value Vcount_M (step S28). If the second counter value Vcount2 agrees with the estimated counter value Vcount_M, the second control unit 210 sets the target time Time_M as the second time information of the second time measurement unit 220 (step S29).

Figure 12:
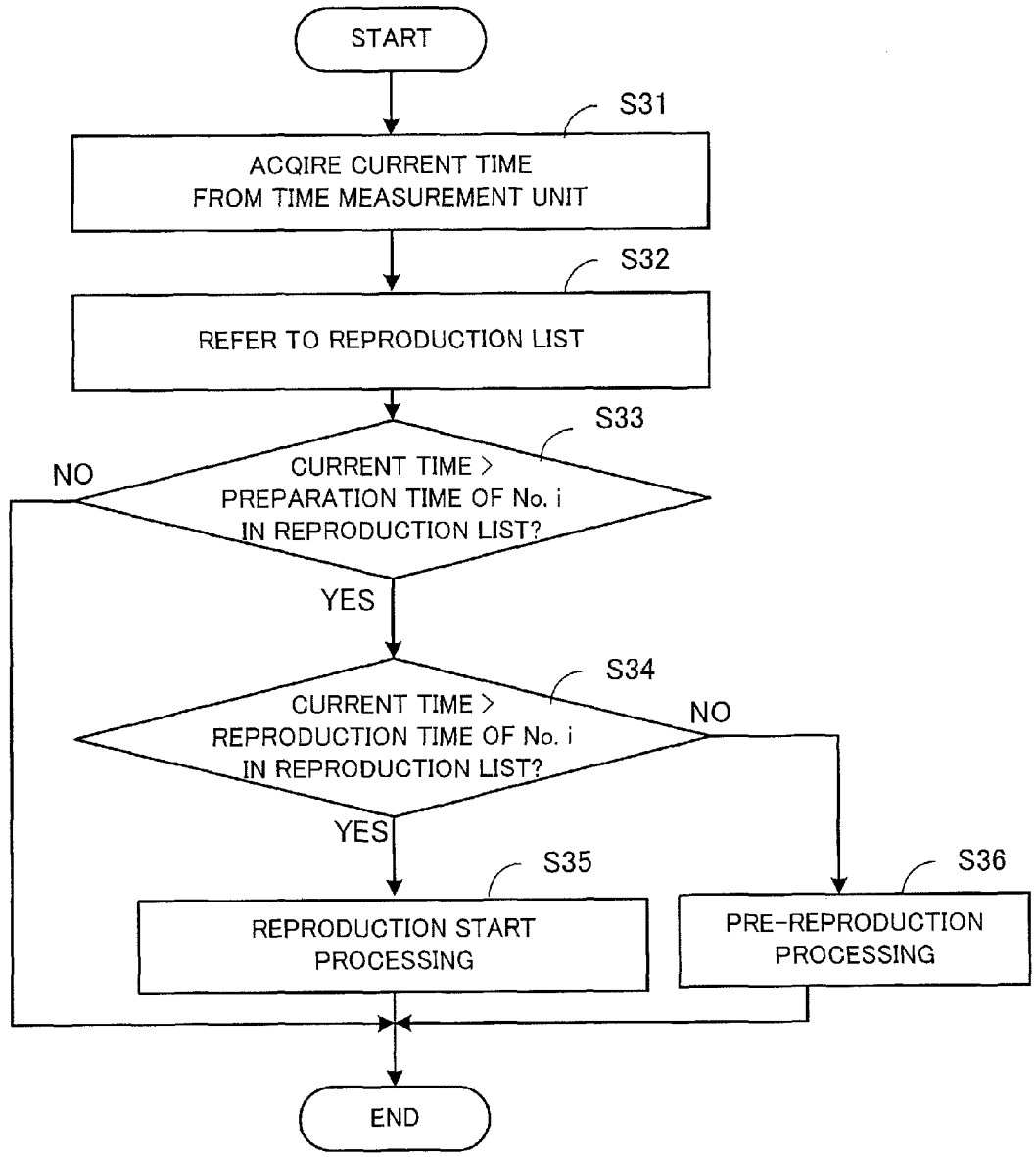
FIG. 12 is a flowchart showing content reproduction processing of the first control unit of the first video information reproduction device according to the first embodiment.

FIG. 12 is a flowchart showing content reproduction processing of the first control unit 110 of the first video information reproduction device 10 as the master device according to the first embodiment. When receiving the first vertical synchronization signal Vsync1 sent from the first synchronization signal processor 150, the first control unit 110 performs the content reproduction processing illustrated in FIG. 12.

As shown in FIG. 2 and FIG. 12, first, the first control unit 110 acquires the first current time from the first time measurement unit 120 (step S31). The first control unit 110 can acquire the first current time in units of milliseconds. Next, the first control unit 110 refers to the reproduction list stored in the first storage unit 100 (step S32). When the reproduction list is as shown in FIG. 6, the first control unit 110 searches for i satisfying that the "acquired first current time" is behind the "preparation time of No. i" and ahead of the "preparation time of No. (i+1)" in time, where i is an integer not smaller than 1. That is, i satisfying Preparation time of No. $i$<Acquired first current time<Preparation time of No. $(i+1)$ is searched for. Consequently, the first control unit 110 determines that the content to be reproduced is the "content of No. i". Next, the first control unit 110 judges whether the "acquired first current time" is after the "preparation time of No. i" (step S33). If the "acquired first current time" is after the "preparation time of No. i" (YES in step S33), the first control unit 110 judges whether the "acquired first current time" is after the "reproduction time of No. i" (step S34). If the "acquired first current time" is after the "reproduction time of No. i," (YES in step S34), the first control unit 110 performs reproduction resume processing of "content of No. i" (step S35). If the "acquired first current time" is not after the "reproduction time of No. i" (NO in step S34), the first control unit 110 performs pre-reproduction processing for the first decoder 130 (step S36) and has the first decoder 130 prepare for content reproduction.

As described above, in the first embodiment, the second decode reference clock signal Dclk2 in the second video information reproduction device 20 is compared with the decode reference clock signal Dclk1 in the first video information reproduction device 10, the frequency of the second decode reference clock signal Dclk2 is changed, and thus the second decode reference clock signal Dclk2 can be synchronized with the decode reference clock signal Dclk1. Moreover, the first current time in the second video information reproduction device 20 is synchronized with the first current time in the first video information reproduction device 10, and then the second video information reproduction device 20 outputs video information on the basis of the reproduction schedule of the content. For this reason, it is possible to synchronize the first video signal output from the first video information reproduction device and the second video signal output from the second video information reproduction device, and synchronized video reproduction is performed between the first display unit 11 and the second display unit 21 in a stable manner.

In the first embodiment, the video information reproduction system is configured by two video information reproduction devices, but the present invention is not limited to such a configuration. For example, if the system is configured by three or more devices, the second synchronization signal processor 250 of a slave device outputs the phase synchronization signal Psync input from the master device to a next slave device as it is, thereby the next slave device can perform the same synchronization signal processing. It is also possible to notify all the slave devices of the time correction information T_info by the master device through the network 50.

The first embodiment describes a method of making the second time information of the second video information reproduction device 20 as the slave device agree with the first time information of the first time measurement unit 120 of the first video information reproduction device 10 as the master device, by using the first time information as a reference, but the present invention is not limited to this example. For example, the first time information and the second time information can also be synchronized by correcting the first time information of the first time measurement unit 120 of the master device and the second time information of the second time measurement unit 220 of the slave device, on the basis of time information serving as another reference notified through the network 50.

<2> Second Embodiment

In the first embodiment described above, the first control unit 110 of the first video information reproduction device 10 as the master device starts time correction processing when it receives the first vertical synchronization signal Vsync1 sent from the first synchronization signal processor 150. The first control unit 110 also determines the estimated counter value Vcount_M and the target time Time_M by giving consideration to the amount of delay until the time correction processing is performed in the second video information reproduction device 20 as the slave device as well as the first current time acquired from the first time measurement unit 120. For this reason, if the time correction processing occurs frequently, the estimated counter value Vcount_M and the target time Time_M should be determined each time the time correction processing is performed, which increases the load applied on the first control unit 110. Moreover, since the time correction information T_info includes the estimated counter value Vcount_M and the target time Time_M, when notification of the time correction information T_info is made, load could be applied on the network 50.

In the second embodiment, however, the first control unit 110 of the first video information reproduction device 10 as the master device starts the time correction processing at predetermined intervals. When the second counter value Vcount2 is a predetermined value, the second control unit 210 of the second video information reproduction device 20 as the slave device sets the target time in the second time measurement unit 220. These are set in advance between the master device and the slave device. This allows the load applied on the first control unit 110 and the load applied on the network 50 to be decreased.

For example, it is supposed that the first control unit 110 performs time correction processing when the first counter value Vcount1 is 0. It is also supposed that the second control unit 210 sets a target time in the second time measurement unit 220 when the second counter value Vcount2 is 120. For the target time Time_M, 4 seconds (that is, equivalent to a period of 120 times of the vertical synchronization signal of video reproduced at 30 frames per second) corresponding to the counter value of "120" is added to the current time. The first control unit 110 of the first video information reproduction device 10 as the master device according to the second embodiment notifies the second video information reproduction device 20 as the slave device of the target time (Time_M=(current time)+4 seconds) as time correction information T_info. In the second embodiment, the first vertical synchronization signal Vsync1 (and the first decode reference clock signal Dclk1) of the first video information reproduction device 10 and the second vertical synchronization signal Vsync2 (and the second decode reference clock signal Dclk2) of the second video information reproduction device 20 are in a synchronized state.

As described above, in the second embodiment, the first control unit 110 does not need to determine the estimated counter value Vcount_M. The information whose notification is sent through the network 50 is limited to the target time Time_M. For this reason, in the second embodiment, load applied on the first control unit 110 and the network 50 can be reduced. In addition, since the time correction processing can be performed periodically, synchronization between the first video signal output from the master device and the second video signal output from the slave device can be maintained.

Figure 13:
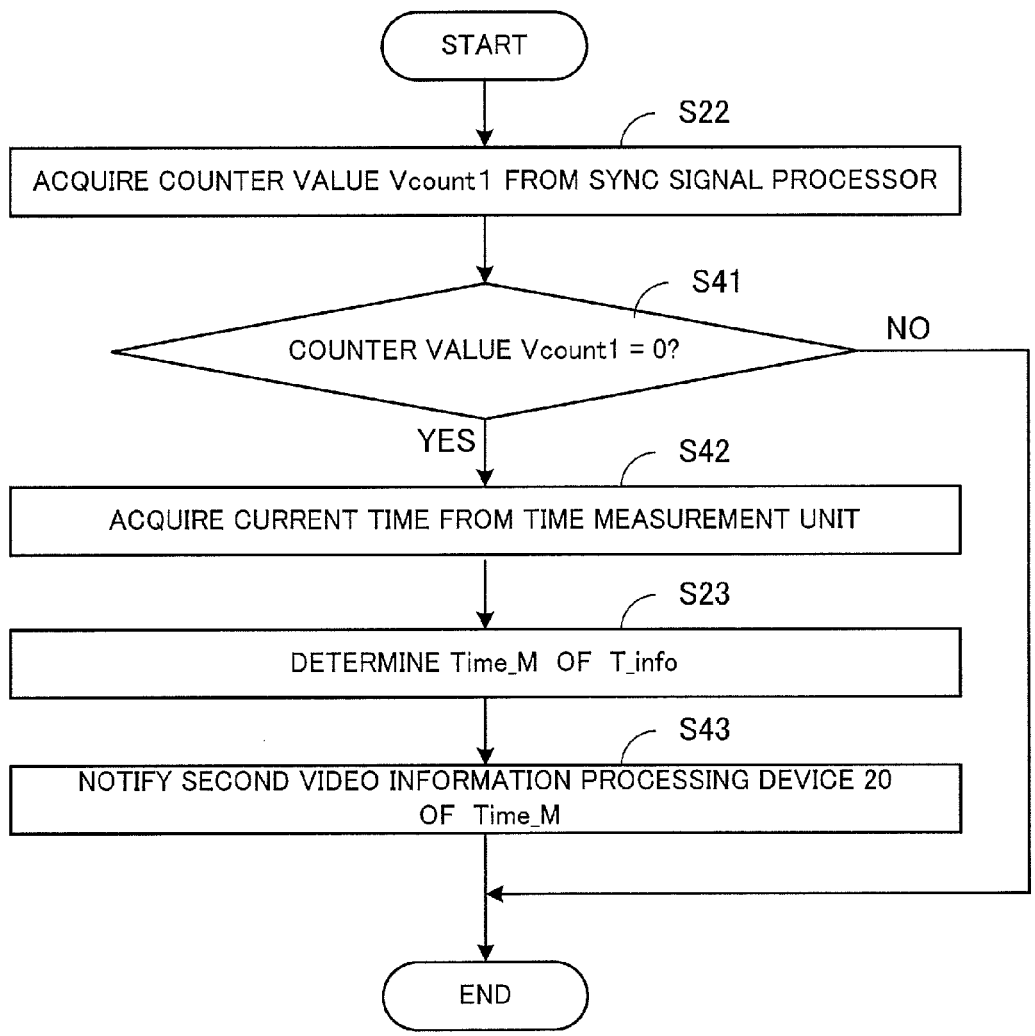
FIG. 13 is a flowchart showing time correction processing of a control unit of a video information reproduction device as a master device according to the second embodiment of the present invention.

FIG. 13 is a flowchart showing time correction processing of the first control unit 110 of the first video information reproduction device 10 as the master device according to the second embodiment. In FIG. 13, steps that are the same as steps in FIG. 10 are assigned the same reference characters as those shown in FIG. 10.

As shown in FIG. 2 and FIG. 13, the first control unit 110 starts the time correction processing illustrated in FIG. 13 when it receives the first vertical synchronization signal Vsync1 sent from the first synchronization signal processor 150. First, the first control unit 110 acquires the first counter value Vcount1 from the first synchronization signal processor 150 (step S22). Next, the first synchronization signal processor 150 determines whether the first counter value Vcount1 is "Vcount1=0" (step S41). If "Vcount1=0" (YES in step S41), the first control unit 110 acquires the first current time from the first time measurement unit 120 (step S42). Next, the first control unit 110 determines the target time Time_M (step S23). Here, the target time Time_M is a value obtained by adding 4 seconds to the "acquired first current time". The first control unit 110 notifies the second video information reproduction device 20 as the slave device of the determined target time Time_M as the time correction information T_info (step S43).

Figure 14:
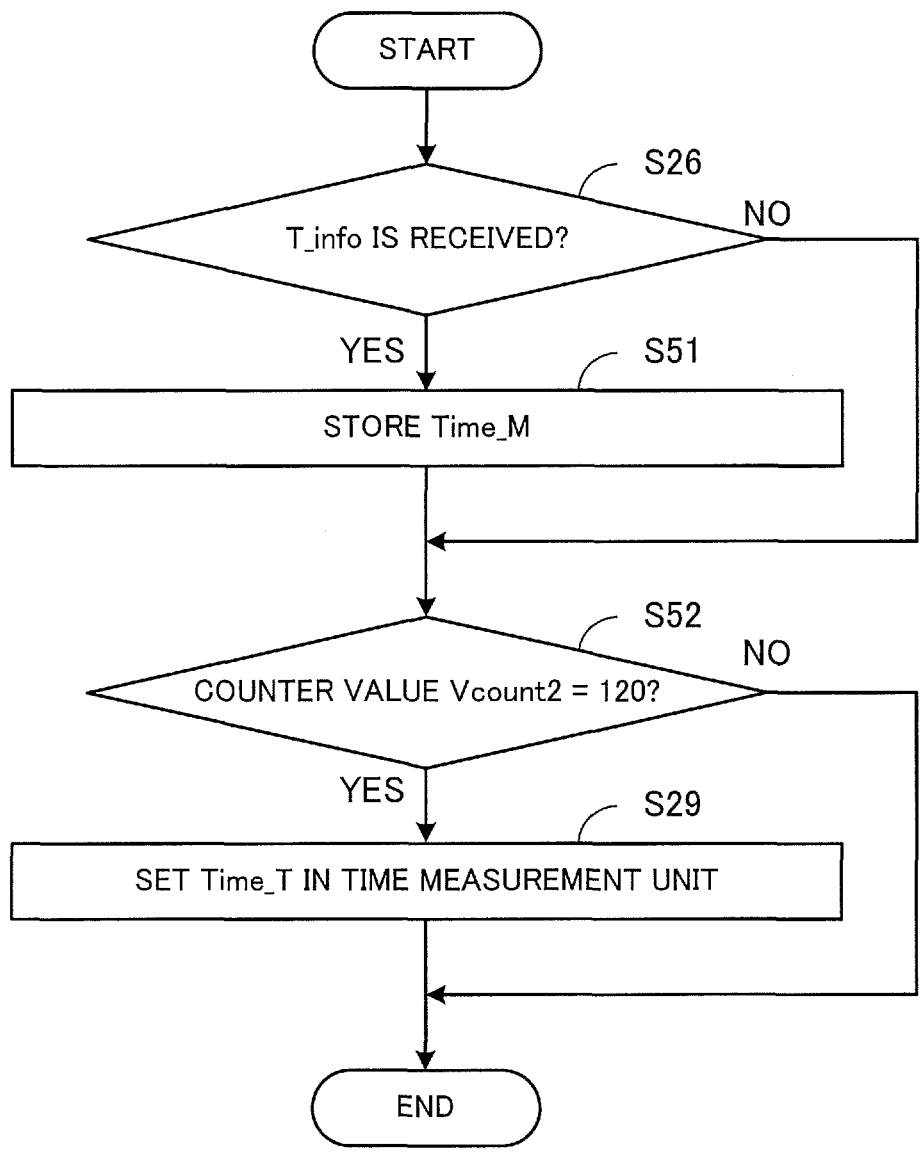
FIG. 14 is a flowchart showing time correction processing of the control unit of the video information reproduction device as a slave device according to the second embodiment.

Next, the processing of the slave device will be described. FIG. 14 is a flowchart showing the time correction processing of the second control unit 210 of the second video information reproduction device 20 as the slave device according to the second embodiment. In FIG. 14, steps that are the same as steps in FIG. 11 are assigned the same reference characters as those shown in FIG. 11. The second control unit 210 starts the time correction processing when it receives the phase synchronization signal Psync (that is, the same timing as that of the first vertical synchronization signal Vsync1 of the master device) sent from the second synchronization signal processor 250.

First, if the target time Time_M sent from the master device is received, the second control unit 210 performs the processing of step S51 and subsequent steps; if not received, it performs the processing of step S52 and subsequent steps (step S26). If the notification of target time Time_M sent from the master device is received, the second control unit 210 stores the target time Time_M (step S51). Next, the second control unit 210 acquires the second counter value Vcount2 from the second synchronization signal processor 250 and determines whether "Vcount2=120", which indicates the timing at which the time correction processing is performed in the slave device (step S52). If "Vcount2=120", the processing of step S29 is performed and if not "Vcount2=120", the processing ends. If "Vcount2=120", the second control unit 210 sets the target time Time_M in the time measurement unit 220 (step S29).

As described above, in the second embodiment, the first control unit 110 does not need to determine the estimated counter value Vcount_M. In addition, the information of which notification is sent through the network 50 is limited to the target time Time_M. For this reason, in the second embodiment, if the first current time in the first video information reproduction device 10 and the second current time in the second video information reproduction device 20 are synchronized, load applied on the first control unit 110 and the network 50 can be reduced.

<3> Third Embodiment

In the first and second embodiments described above, the number of bits for the first counter value Vcount1 and the number of bits for the second counter value Vcount2 are fixed values (8 bits). However, the load on the network varies on the basis of the types and number of video information reproduction devices forming the video information reproduction system, the content reproduction method, and the like. For this reason, it is preferable that the time intervals at which the time correction processing is performed be changed depending on the load on the network: For example, if the load on the network is light (reduced), the time intervals at which the time correction processing is performed is shortened (reduced); if the load on the network is heavy (increased), the time intervals at which the time correction processing is performed is lengthened (increased). For this reason, in a video information reproduction system according to the third embodiment, the number of bits of the first counter value Vcount1 and the number of bits of the second counter value Vcount2 that determine the time intervals at which the time correction processing is performed can be changed depending on the load on the network. In other respects, the third embodiment is the same as any of the first and second embodiments described earlier. Accordingly, in the description of the third embodiment, FIG. 2 is also referred to.

For example, the first control unit 110 sends instructions to set the number of bits of the first counter value Vcount1 to the first synchronization signal processor 150 on the basis of the load on the network, and the first synchronization signal processor 150 sets the number of bits of the first counter value Vcount1 on the basis of setting instructions. The second control unit 210 also sends instructions to set the number of bits of the second counter value Vcount2 to the second synchronization signal processor 250 on the basis of the load on the network, and the second synchronization signal processor 250 sets the number of bits of the second counter value Vcount2 on the basis of the setting instructions. As for the load on the network, the first control unit 110 and the second control unit 210 receives information, for example, from an external status monitoring device, instructions input by the user, or the like, and the notification of instructions to change the number of bits of the counter value can be given depending on the load on the network.

Figure 15:
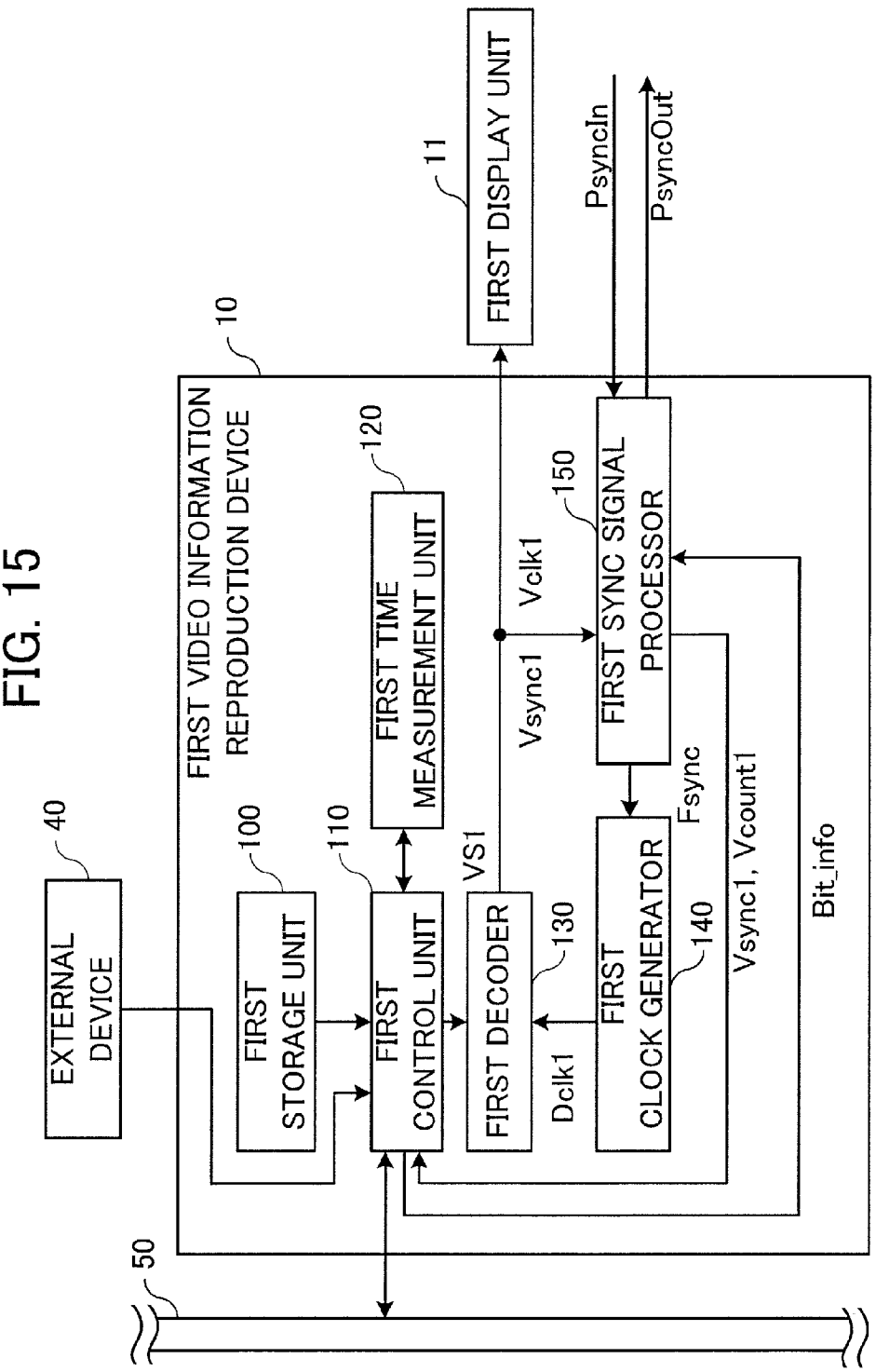
FIG. 15 is a block diagram schematically showing a configuration of a video information reproduction device according to the third embodiment of the present invention.

FIG. 15 is a block diagram schematically showing a configuration of the first video information reproduction device 10 according to the third embodiment of the present invention. FIG. 15 schematically shows an example of an external device 40. Since the description of the first video information reproduction device 10 is the same as the description for FIG. 1, components in FIG. 15 that are the same as components in FIG. 1 are assigned the same reference characters as those shown in FIG. 1. The external device 40 monitors the statuses of the network 50 and sends information of the network 50 to the first control unit 110. The first control unit 110 estimates load on the network 50 from the received information of the network 50. The first control unit 110 notifies the first synchronization signal processor 150 of instructions Bit_info to change the number of bits of the counter value Vcount1 on the basis of the estimated load on the network 50.

For example, if the video information reproduction system is configured by two video information reproduction devices, as shown in the first and second embodiments, and if each video information reproduction device stores content data in a storage unit (e.g., the first storage unit 100 and the second storage unit 200), the load on the network is light, and the time correction processing can be performed at short intervals. For this reason, in this case, each video information reproduction device sets the number of bits of the counter value (e.g., the number of bits of the first counter value Vcount1 and the number of bits of the second counter value Vcount2) to 4 bits.

If the video information reproduction system is configured by more than two video information reproduction devices, and if streaming reproduction is performed, for example, the load on the network is heavy, and performing the time correction processing frequently is not preferable because it would increase the load on the network further. For this reason, in this case, each video information reproduction device sets the number of bits of the counter value to 10 bits.

As described above, in the video information reproduction system according to the third embodiment, the number of bits of the counter value can be changed depending on the load on the network. For this reason, in the video information reproduction system according to the third embodiment, the time correction processing can be performed at appropriate intervals depending on the load on the network.

<4> Fourth Embodiment

Figure 16:
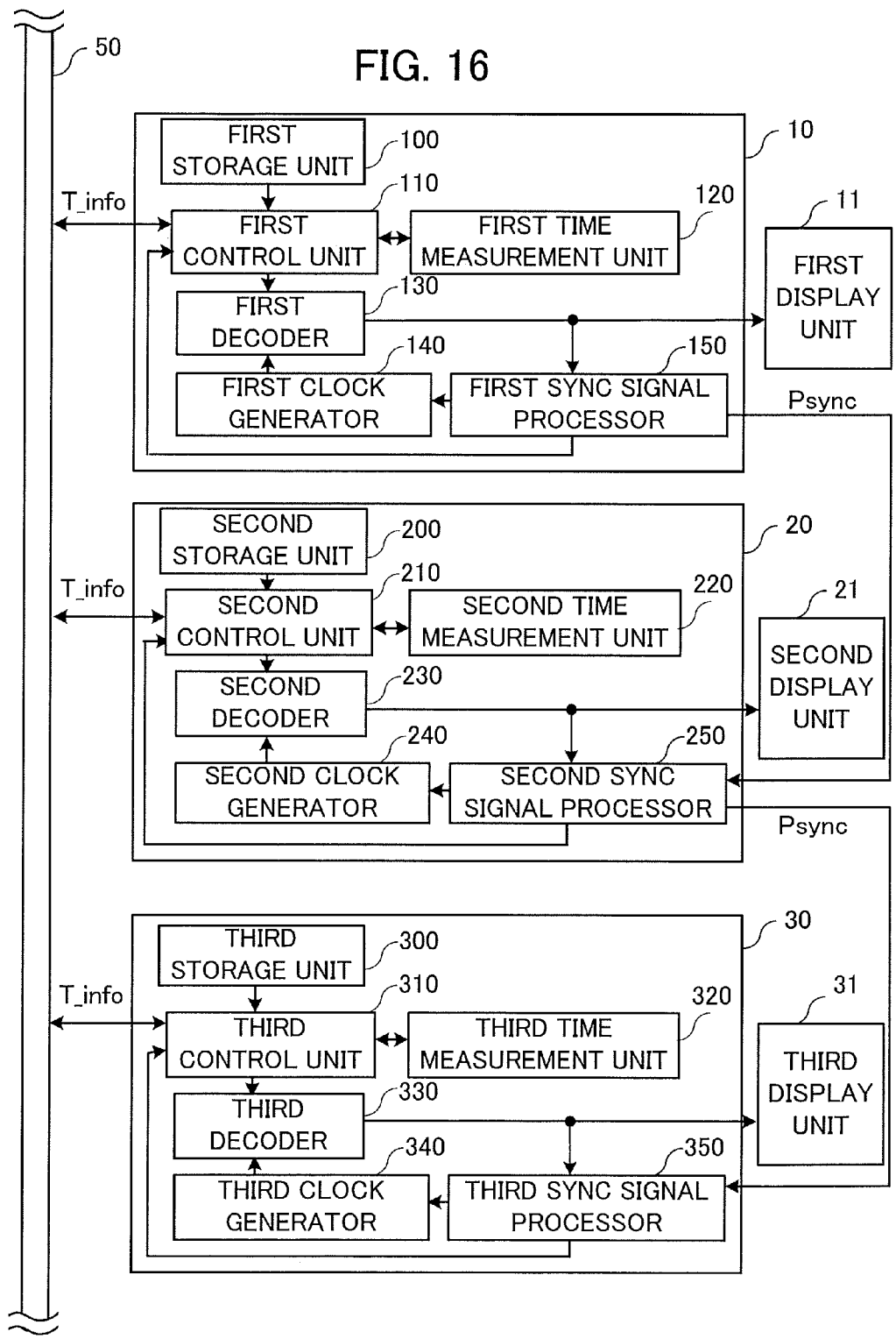
FIG. 16 is a block diagram schematically showing a configuration of a video information reproduction system according to the fourth embodiment.

FIG. 16 is a block diagram schematically showing a configuration of a video information reproduction system according to the fourth embodiment. FIG. 16 schematically shows an example of the video information reproduction system including three video information reproduction devices. Since the description of the first video information reproduction device 10 and the second video information reproduction device 20 is the same as the description for FIGS. 1 and 2, components in FIG. 16 that are the same as components in FIGS. 1 and 2 are assigned the same reference characters as those shown in FIGS. 1 and 2.

As shown in FIG. 16, a third video information reproduction device 30 includes a third storage unit 300, a third control unit 310, a third time measurement unit 320, a third decoder 330, a third clock generator 340, and a third synchronization signal processor 350. When the third video information reproduction device 30 as a single device is described, the third video information reproduction device 30, the third storage unit 300, the third control unit 310, the third time measurement unit 320, the third decoder 330, the third clock generator 340, the third synchronization signal processor 350, and the third display unit 31 are also referred to as the video information reproduction device 30, the storage unit 300, the control unit 310, the time measurement unit 320, the decoder 330, the clock generator 340, the synchronization signal processor 350, and the display unit 31 respectively.

The third video information reproduction device 30 supplies the third display unit 31 with a signal for displaying video on the first display unit 31. The third storage unit 300 stores content data and a reproduction time (e.g., a reproduction start time) indicating the time at which the content data is reproduced. The third clock generator 340 generates a third decode reference clock signal Dclk3. The third time measurement unit 320 generates a third current time. The third decoder 330 performs decoding on the content data on the basis of the third decode reference clock signal Dclk3, generates a third video signal, a third video clock signal Vclk3 that is used to send the third video signal, and a third vertical synchronization signal Vsync3 that is used to reproduce the third video signal, and outputs the third video signal and the third vertical synchronization signal Vsync3 to the third display unit 31 on the basis of the third video clock signal Vclk3. The third synchronization signal processor 350 generates a third counter value Vcount3 the value of which is incremented each time the third vertical synchronization signal Vsync3 is output. The third control unit 310 compares the third current time acquired from the third time measurement unit 320 with the reproduction time stored in the third storage unit 300 and controls the third decoder 330 on the basis of the result of this comparison.

The third storage unit 300 stores the content data and content reproduction schedule information sent from the network 50 on the basis of the control by the third control unit 310. The third control unit 310 sends the content data stored in the third storage unit 300 to the third decoder 330 and controls the third decoder 330 in such a manner that video based on the content is displayed by the third display unit 31 on the basis of the reproduction schedule information. Such control by the third control unit 310 is referred to as content reproduction processing. The third control unit 310 also performs processing (time correction processing) to associate time based on the third time measurement unit 320 of the third video information reproduction device 30 and time in another video information reproduction device through the network 50. Here, the third control unit 310 can perform the time correction processing, receiving time correction information T_info whose notification is made by the first control unit 110 of the first video information reproduction device 10. The third time measurement unit 320 generates third time information of the third video information reproduction device 30. The third time information is referred to as the third current time by the third control unit 310. In the time correction processing, if the third control unit 310 sends a notification of a request to update the third time information, the third time measurement unit 320 changes (adjusts) the third time information and generates a third current time based on the changed third time information.

The third decoder 330 receives the content data sent from the third control unit 310 as an input and generates a digital video signal VS3 on the basis of the third decode reference clock signal Dclk3 generated in the third clock generator 340. Here, the digital video signal VS3 includes at least a third video clock signal Vclk3, a third vertical synchronization signal Vsync3, and a horizontal synchronization signal Hsync3 as well as RGB data in the third video signal. The third decoder 330 outputs the digital video signal (video signal and the like), the third vertical synchronization signal Vsync3, and the horizontal synchronization signal Hsync3 to the third display unit 31 on the basis of the third video clock signal Vclk3. If the digital video signal VS3 is received, the third display unit 31 displays the content on a frame-by-frame basis on the basis of the third vertical synchronization signal Vsync3.

The third synchronization signal processor 350 has a function for reproducing content by the third video information reproduction device 30, the first video information reproduction device 10, and the second video information reproduction device 20 in synchronization with one another. The third synchronization signal processor 350 generates a third counter value Vcount3. The third counter value Vcount3 is a value incremented (counted up) by one at the timing of the third vertical synchronization signal Vsync3 sent from the third decoder 330. That is, the value of the third counter value Vcount3 is incremented each time the third vertical synchronization signal Vsync3 is output from the third decoder 330. In the fourth embodiment, the third counter value Vcount3 has 8 bits (the number of bits is fixed to 8 bits), and the value is counted from 0 to 255, for example. The third synchronization signal processor 350 sends the third vertical synchronization signal Vsync3 and the third counter value Vcount3 to the third control unit 310. If the third video information reproduction device 30 functions as a slave device (a slave) among a plurality of video information reproduction devices, the third synchronization signal processor 350 receives the phase synchronization signal Psync (PsyncOut in FIG. 1) sent from the second synchronization signal processor 250 of the second video information reproduction device 20 and notifies the third clock generator 340 of clock correction information Fsync based on the phase synchronization signal Psync.

In the fourth embodiment, the first video information reproduction device 10 operates as a master device, and the second video information reproduction device 20 and the third video information reproduction device 30 operate as slave devices. When receiving the phase synchronization signal Psync sent from the first video information reproduction device 10, the second video information reproduction device 20 sends the phase synchronization signal Psync to the third video information reproduction device 30. For this reason, the third video information reproduction device 30 can synchronize the third decode reference clock signal Dclk3 with the first decode reference clock signal Dclk1 and the second decode reference clock signal Dclk2.

The first video information reproduction device 10 notifies the second video information reproduction device 20 and the third video information reproduction device 30 of the time correction information T_info through the network 50. For this reason, the third video information reproduction device 30 can synchronize the third current time in the third video information reproduction device 30 with the first current time in the first video information reproduction device 10 and the second current time in the second video information reproduction device 20.

As described above, among the three video information reproduction devices, the decode reference clock signals and the current times can be synchronized. This allows synchronization among the first video signal output from the first video information reproduction device, the second video signal output from the second video information reproduction device, and the third video signal output from the third video information reproduction device, and synchronized video reproduction among the first display unit 11, the second display unit 21, and the third display unit 31 is performed in a stable manner.

<5> Fifth Embodiment

Figure 17:
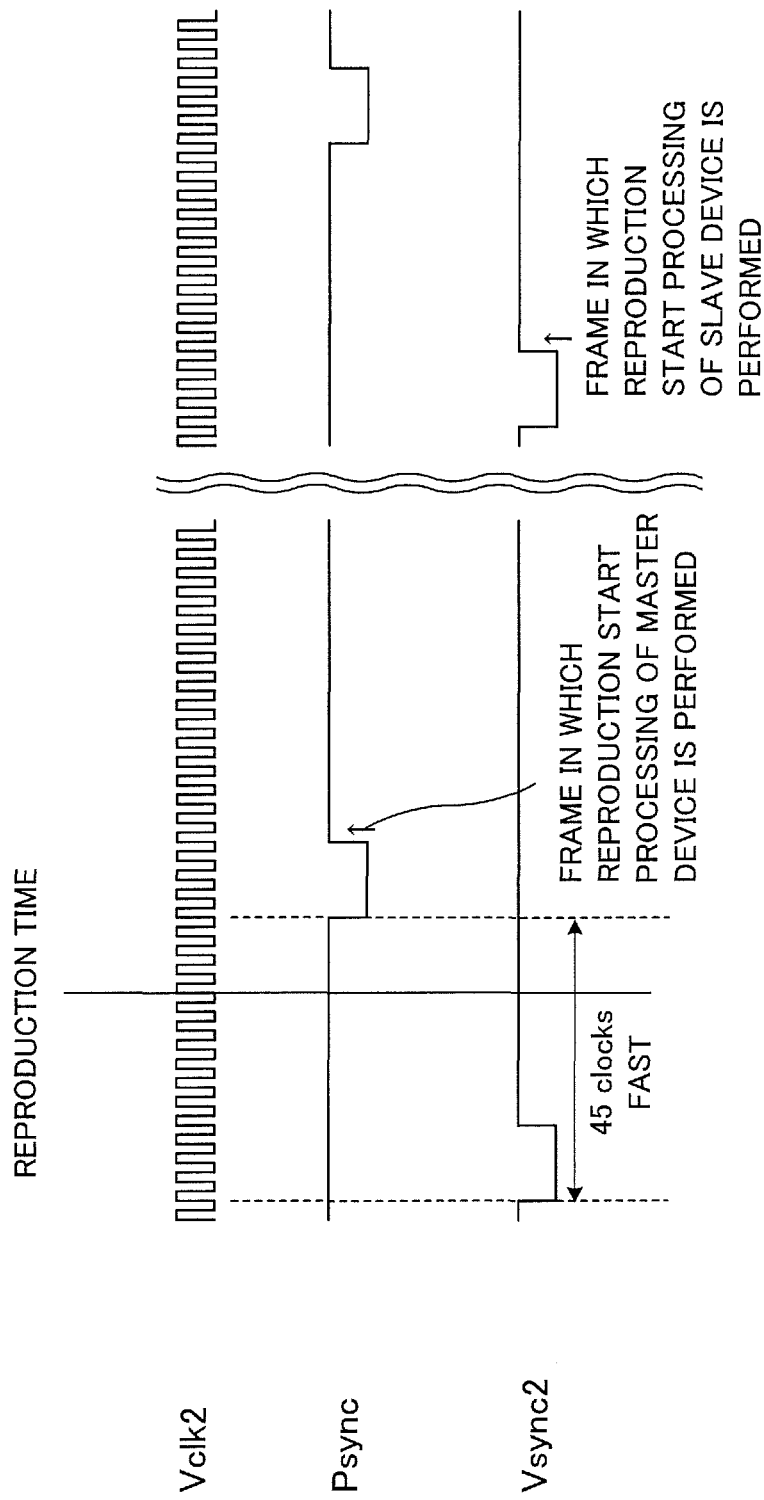
FIG. 17 is a timing chart showing signals in a comparison example related to the fifth embodiment.

In the first to fourth embodiments described above, if the reproduction time of the content comes between the vertical synchronization signals Vsync1 and Vsync2 while the vertical synchronization signal Vysnc1 of the master device and the vertical synchronization signal Vsync2 of the slave device are in a transient state of synchronization, either the master device or the slave device that has an advanced vertical synchronization signal (the master device or the slave device) performs the reproduction start processing, and the delayed device (the slave device or the master device) does not perform the reproduction start processing until the timing of the next vertical synchronization signal, and a difference of one frame could be generated between the content reproduction start timings of the master device and the slave device. That is, as shown in the timing chart of a comparison example in FIG. 17, if the second vertical synchronization signal Vsync2 is ahead of (appears earlier than) the phase synchronization signal Psync, when the content reproduction time comes in a 45-clock period between the second vertical synchronization signal Vsync2 and the phase synchronization signal Psync, the master device performs the reproduction start processing at the timing (frame in which the reproduction start processing of the master device is performed) of the immediately following phase synchronization signal Psync (the first low level in FIG. 17) in the phase synchronization signals Psync. In the slave device, since the reproduction time determination has been completed, the reproduction start processing is performed at the timing (frame in which the reproduction start processing of the slave device is performed) of a next second vertical synchronization signal Vsync2 (the second low level from the left in FIG. 17).

In the fifth embodiment, however, since the master device sends a notification of the timing of content reproduction control by counter information, the slave device can perform content reproduction control on the basis of the counter information updated at the timing of the second vertical synchronization signal Vsync2, without referring to the time information, and all the video information reproduction devices included in the video information reproduction system can perform reproduction control at the timing of the first vertical synchronization signal Vsync1 specified by the master device. In the description below, FIG. 2, FIG. 6, and FIG. 12 described in the first embodiment are also referred to.

Figure 18:
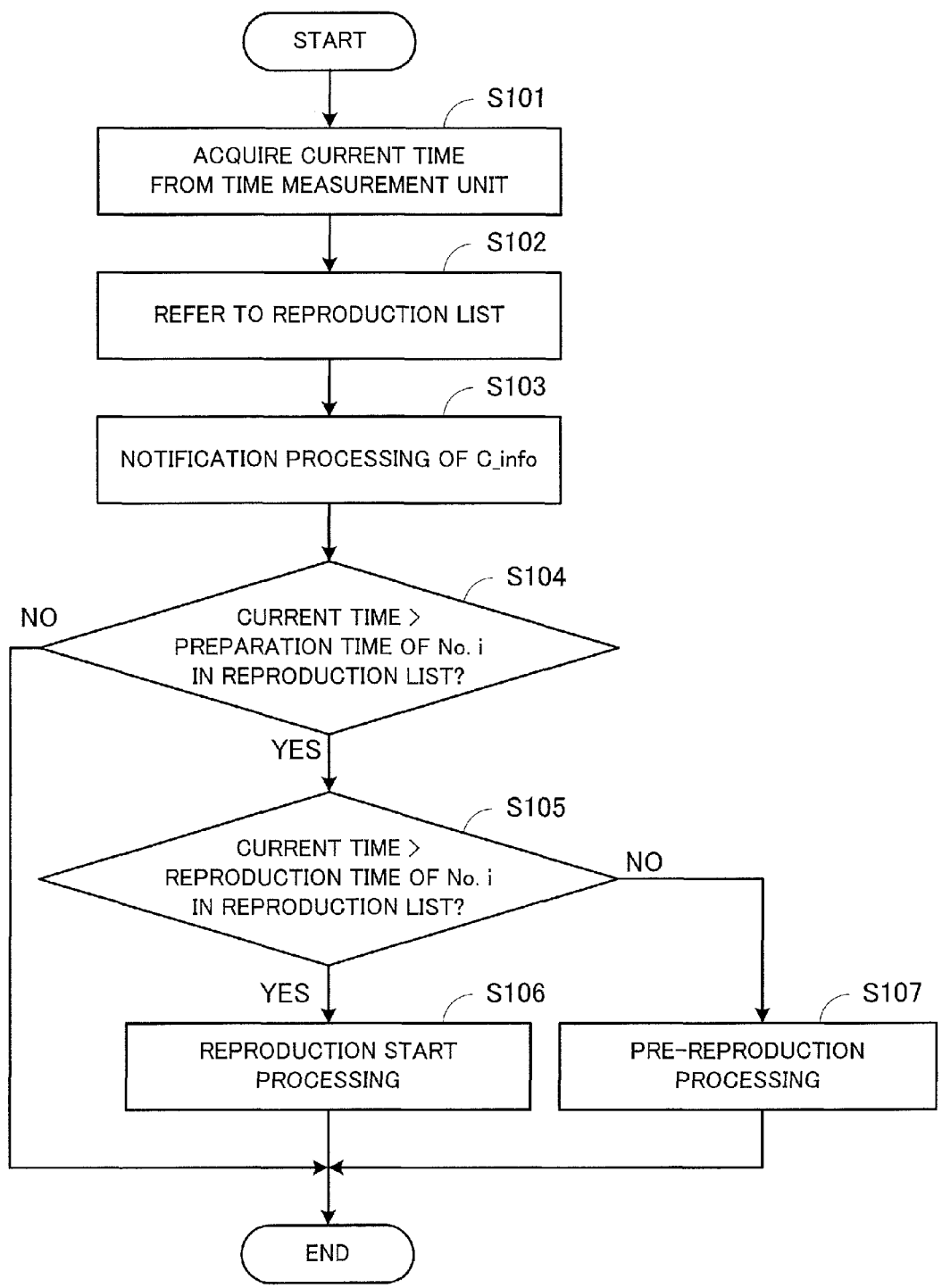
FIG. 18 is a flowchart showing reproduction processing of a control unit of a video information reproduction device as a master device according to the fifth embodiment.

FIG. 18 is a flowchart showing reproduction processing of the first control unit 110 of the video information reproduction device 10 as the master device according to the fifth embodiment. When receiving the first vertical synchronization signal Vsync1 sent from the first synchronization signal processor 150, the first control unit 110 performs the content reproduction processing illustrated in FIG. 18.

As shown in FIG. 18, first, the first control unit 110 acquires a first current time from the first time measurement unit 120 (step S101). Next, the first control unit 110 refers to a reproduction list (e.g., FIG. 6) stored in the first storage unit 100 (step S102). Then, the first control unit 110 performs counter information (C_info) notification processing on the basis of the first current time and the time information of the reproduction list (step S103). The subsequent processing from step S104 to step S107 is the same as the processing from step S33 to step S36 in the first embodiment (FIG. 12).

FIG. 19 is a flowchart showing the counter information (C_info) notification processing (step S103) of the first control unit 110 of the video information reproduction device 10 as the master device according to the fifth embodiment. The first control unit 110 makes a preparation timing notification judgment from the first current time and time Pre_time obtained by subtracting a certain period N_time within a period C_period of a single cycle of the counter from the preparation time in the reproduction list (step S111). If the first current time is after the time Pre_time for the first time (YES in step S111), the first control unit 110 performs control operation for processing of step S112 and subsequent steps; if not (NO in step S111), control operation for processing of step S113 and subsequent steps is performed. For example, for an 8-bit counter, a period C_period of a single cycle is about 8 seconds 533 milliseconds, because of 256 frames at 30 frames per second. Therefore, if the certain period N_time is 3 seconds, the time Pre_time for content CM_001 (No. 1 in FIG. 6) is 14 (hours):59 (minutes): 52 (seconds) obtained by subtracting a certain period N_time of three seconds from the preparation time of 14 (hours):59 (minutes):55 (seconds), and when the first current time is after this time Pre_time for the first time, a preparation timing notification is made.

If the first current time is after the time Pre_time of the corresponding content in the reproduction list for the first time, counter information (C_info) notification processing for preparation timing notification is performed (step S112). The counter information C_info includes, for example, a content name C_name, a control type C_type, and a counter value C_value. The content name C_name indicates a content name to be defined in the reproduction list. The control type C_type indicates details of control at the notification timing: For example, it indicates preparation, reproduction, or the like. The counter value C_value is a counter value indicating a control timing or, more specifically, a value (first control counter value) obtained by adding the counter value of the certain period N_time to the value of the current first counter value Vcount1. The contents of the counter information C_info for preparation timing notification are:
C_name="target content name",
C_type="preparation", and
C_value="current Vcount1 value+90 (3 seconds at 30 frames per second)".

Next, the first control unit 110 makes a reproduction timing notification judgment from the first current time and a time Play_time obtained by subtracting a certain period N_time within a period C_period of a single cycle of the counter from the reproduction time in the reproduction list (step S113). If the first current time is after the time Play_time for the first time (YES in step S113), the first control unit 110 performs control operation for processing of step S114 and subsequent steps; if not, (NO in step S111), the counter information notification processing ends.

If the first current time is after the time Play_time of the corresponding content in the reproduction list for the first time, the first control unit 110 performs control operation for the counter information (C_info) notification processing for reproduction timing notification (step S113). The contents of counter information C_info for reproduction timing notification are:
C_name="target content name",
C_type="reproduction", and
C_value="current Vcount1 value+90".

FIG. 20 is a flowchart showing reproduction processing of the second control unit 210 of the video information reproduction device 20 as a slave device according to the fifth embodiment. When receiving the first vertical synchronization signal Vsync1 of the master device sent from the second synchronization signal processor 250, the second control unit 210 starts reproduction processing.

First, if counter information C_info sent from the first video information reproduction device 10 is received (YES in step S121), the second control unit 210 performs the processing of step S122 and subsequent steps; if not received (NO in step S121), the processing of step S123 and subsequent steps is performed. If the counter information C_info is received, the second control unit 210 stores (holds) the content name C_name, the control type C_type, and the counter value C_value included in the counter information C_info (step S122). Next, the second control unit 210 acquires a second counter value Vcount2 sent from the second synchronization signal processor 250 and compares the acquired second counter value Vcount2 with the stored counter value C_value (step S123). Here, the value of the second counter value Vcount2 is the same as the value of the first counter value Vcount1 because the device is operating as the slave device.

If the second counter value Vcount2 agrees with the stored counter value C_value, the second control unit 210 performs control operation for the processing of step S124 and subsequent steps; if not, the processing ends. If the second counter value Vcount2 agrees with the stored counter value C_value, the second control unit 210 makes a judgment by the control type C_type (step S124). If the control type C_type is "reproduction", the second control unit 210 performs reproduction start processing for the stored content of the content name C_name (step S125). If the control type C_type is "preparation", the second control unit 210 performs reproduction preparation processing for the content of the stored content name C_name (step S126).

As described above, in the fifth embodiment, by performing content reproduction control (preparation and reproduction) of the second video information reproduction device 20 by the first video information reproduction device 10, from the counter information C_info whose notification is provided on the basis of the first current time and the time Pre_time obtained by subtracting a certain period N_time within a period C_period of a single cycle of the counter from the preparation time in the reproduction list and from the second counter value Vcount2, reproduction can be started at the same timing of the first counter value Vcount1. For this reason, the master device and the slave device can perform synchronized reproduction, irrespective of the relation between the timing of the vertical synchronization signal and a switch timing of content.

Further, in the fifth embodiment, since the second video information reproduction device 20 is synchronized with the reproduction schedule of the first video information reproduction device 10, if the clock of the time measurement unit 120 of the first video information reproduction device 10 is adjusted to the clock of an external display system connected through a network or the like, the system can synchronize with another display system.

The embodiments are not limited to the description given above. Without departing from the scope of the invention, various changes can be made to each embodiment, and each embodiment can be combined with another embodiment.

DESCRIPTION OF REFERENCE CHARACTERS 10 first video information reproduction device (master device); 11 first display unit; 100 first storage unit; 110 first control unit; 120 first time measurement unit; 130 first decoder; 140 first clock generator; 150 first synchronization signal processor; second video information reproduction device (slave device); 21 second display unit; 200 second storage unit; 210 second control unit; 220 second time measurement unit; 230 second decoder; 240 second clock generator; 250 second synchronization signal processor; third video information reproduction device; 31 third display unit; 300 third storage unit; 310 third control unit; 320 third time measurement unit; 330 third decoder; 340 third clock generator; 350 third synchronization signal processor; 40 external device; 50 network.

What is claimed is:

1. A video information reproduction system comprising a first video information reproduction device and a second video information reproduction device, the first video information reproduction device comprising:
a first storage unit configured to store first content data and a first reproduction time;
a first clock generator that generates a first decode reference clock signal;
a first time measurement unit;
a first decoder that performs decoding to generate content data including a first video signal, a first video clock signal, and a first vertical synchronization signal, from the first content data on a basis of the first decode reference clock signal;

a first synchronization signal processor that generates a first counter value to be incremented each time the first vertical synchronization signal is output; and a first control unit that makes a first comparison by comparing a first current time acquired from the first time measurement unit and the first reproduction time stored in the first storage unit and controls the first decoder on a basis of a result of the first comparison;

the second video information reproduction device comprising:

a second storage unit configured to store second content data and a second reproduction time;

a second clock generator that generates a second decode reference clock signal;

a second time measurement unit;

a second decoder that performs decoding to generate content data including a second video signal, a second video clock signal, and a second vertical synchronization signal, from the second content data on a basis of the second decode reference clock signal;

a second synchronization signal processor that generates a second counter value to be incremented each time the second vertical synchronization signal is output; and a second control unit that makes a second comparison by comparing a second current time acquired from the second time measurement unit and the second reproduction time stored in the second storage unit and controls the second decoder on a basis of a result of the second comparison; wherein:

the first synchronization signal processor generates a phase synchronization signal by combining the first vertical synchronization signal with a signal based on the first counter value and sends the phase synchronization signal to the second synchronization signal processor;

the second synchronization signal processor makes a third comparison by comparing a first vertical synchronization signal separated from the phase synchronization signal and the second vertical synchronization signal on a basis of the second video clock signal, the second clock generator changes a frequency of the second decode reference clock signal on a basis of a result of the third comparison, and updates the second counter value to the first counter value obtained from a signal based on the first counter value separated from the phase synchronization signal;

the first control unit notifies the second control unit of the first current time based on the first counter value obtained from the phase synchronization signal; and the second control unit updates the second current time based on the second counter value, to the notified first current time.

2. The video information reproduction system according to claim 1, wherein:

if the second vertical synchronization signal is judged to be ahead of the phase synchronization signal as the result of the third comparison, the second clock generator reduces the frequency of the second decode reference clock signal; and if the second vertical synchronization signal is judged to be behind the phase synchronization signal as the result of the third comparison, the second clock generator increases the frequency of the second decode reference clock signal.

3. The video information reproduction system according to claim 1, wherein when the first current time generated by the first time measurement unit is changed, the second time measurement unit changes the second current time generated by the second time measurement unit to match the changed first current time.

4. The video information reproduction system according to claim 3, wherein:

when the first current time of the first time measurement unit is changed, the first control unit determines a target time as the second current time generated by the second time measurement unit and an estimated counter value which is the first counter value at the time when the target time is set in the second time measurement unit, generates time correction information including the target time and the estimated counter value, and notifies the second control unit of the time correction information; and the second control unit refers to the second counter value generated by the second synchronization signal processor and, when the second counter value agrees with the estimated counter value, sets the target time as the second current time of the second time measurement unit.

5. The video information reproduction system according to claim 1, further comprising a network that sends a notification of a reference time;

wherein the first current time of the first time measurement unit is set on a basis of the reference time.

6. The video information reproduction system according to claim 5, wherein the first synchronization signal processor of the first video information reproduction device changes the number of bits of the first counter value on a basis of network load information whose notification is provided by the network.

7. The video information reproduction system according to claim 6, wherein the first synchronization signal processor of the first video information reproduction device increases the number of bits of the first counter value when a network load whose notification is provided by the network is increased and decreases the number of bits of the first counter value when the network load is reduced.

8. The video information reproduction system according to claim 1, wherein:

the first video information reproduction device operates as a master device that generates the phase synchronization signal and sends the phase synchronization signal to the second video information reproduction device on a basis of first mode information stored in the first storage unit; and the second video information reproduction device operates as a slave device that receives the phase synchronization signal on a basis of second mode information stored in the second storage unit.

9. The video information reproduction system according to claim 1, further comprising a third video information reproduction device that receives the phase synchronization signal.

10. A video information reproduction device as a master device in a plurality of video information reproduction devices included in a video information reproduction system, the video information reproduction device comprising:

a storage unit configured to store content data and a reproduction time;

a clock generator that generates a decode reference clock signal;

a time measurement unit;

a decoder that performs decoding to generate content data including a video signal, a video clock signal, and a vertical synchronization signal, from the content data stored in the storage unit on a basis of the decode reference clock signal;

a synchronization signal processor that generates a counter value to be incremented each time the vertical synchronization signal is output; and a control unit that makes a comparison by comparing a current time acquired from the time measurement unit and the reproduction time stored in the storage unit and controls the decoder on a basis of a result of the comparison; wherein:

the synchronization signal processor generates a phase synchronization signal by combining the vertical synchronization signal and a signal based on the counter value and sends the phase synchronization signal to a video information reproduction device as a slave device among the plurality of video information reproduction devices; and the control unit sends a current time based on a counter value obtained from the phase synchronization signal, to the video information reproduction device as the slave device.

11. A video information reproduction device as a slave device in a plurality of video information reproduction devices included in a video information reproduction system, the video information reproduction device comprising:

a storage unit configured to store content data and reproduction time;

a clock generator that generates a decode reference clock signal;

a time measurement unit;

a decoder that performs decoding to generate content data including a video signal, a video clock signal, and a vertical synchronization signal, from the content data stored in the storage unit on a basis of the decode reference clock signal;

a synchronization signal processor that generates a counter value that is incremented each time the vertical synchronization signal is output; and a control unit that makes a first comparison by comparing a current time acquired from the time measurement unit and the reproduction time stored in the storage unit and controls the decoder on a basis of a result of the first comparison; wherein:

the synchronization signal processor receives a phase synchronization signal sent from a video information reproduction device as a master device of the plurality of video information reproduction devices;

a second comparison is made by comparing a vertical synchronization signal separated from the phase synchronization signal and the vertical synchronization signal on a basis of the video clock signal, and the clock generator changes a frequency of the decode reference clock signal on a basis of a result of the second comparison;

a counter value generated by the synchronization signal processor is updated to a counter value obtained from a signal based on a counter value separated from the phase synchronization signal; and the control unit that updates a current time based on a counter value obtained from the phase synchronization signal to a current time whose notification is sent from the master device.

12. A video information reproduction system comprising a first video information reproduction device and a second video information reproduction device;

the first video information reproduction device comprising:

a first storage unit configured to store first content data and a first reproduction time;

a first clock generator that generates a first decode reference clock signal;

a first time measurement unit;

a first decoder that performs decoding to generate content data including a first video signal, a first video clock signal, and a first vertical synchronization signal, from the first content data on a basis of the first decode reference clock signal;

a first synchronization signal processor that generates a first counter value increasing when the first vertical synchronization signal is output; and a first control unit that makes a first comparison by comparing a first current time acquired from the first time measurement unit and the first reproduction time stored in the first storage unit and controls the first decoder on a basis of a result of the first comparison;

the second video information reproduction device comprising:

a second storage unit configured to store second content data and a second reproduction time;

a second clock generator that generates a second decode reference clock signal;

a second decoder that performs decoding to generate content data including a second video signal, a second video clock signal, and a second vertical synchronization signal, from the second content data on a basis of the second decode reference clock signal;

a second synchronization signal processor that generates a second counter value increasing when the second vertical synchronization signal is output; and a second control unit controlling the second decoder; wherein:

the first synchronization signal processor generates a phase synchronization signal by combining the first vertical synchronization signal with a signal based on the first counter value and sending the phase synchronization signal to the second synchronization signal processor;

the second synchronization signal processor makes a second comparison by comparing a first vertical synchronization signal separated from the phase synchronization signal and a second vertical synchronization signal on a basis of the second video clock signal, and the second clock generator changes the frequency of the second decode reference clock signal on a basis of a result of the second comparison, and updates the second counter value to a first counter value obtained from a signal based on a first counter value separated from the phase synchronization signal;

the first control unit notifies the second control unit of a first counter value obtained from the phase synchronization signal and a first control counter value controlling the first decoder on a basis of a first reproduction time; and the second control unit makes a third comparison by comparing the second counter value and the first control counter value whose notification is provided, and controls the second decoder on a basis of a result of the third comparison.

* * * * *